(12) United States Patent
Ma et al.

(10) Patent No.: US 10,779,000 B2
(45) Date of Patent: Sep. 15, 2020

(54) MOTION-COMPENSATED PREDICTION METHOD AND APPARATUS

(71) Applicant: Huawei Technologies Co., Ltd., Shenzhen (CN)

(72) Inventors: Xiang Ma, Shenzhen (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/371,486

(22) Filed: Apr. 1, 2019

(65) Prior Publication Data

US 2019/0230377 A1 Jul. 25, 2019

Related U.S. Application Data

(63) Continuation of application No. PCT/CN2017/104030, filed on Sep. 28, 2017.

(30) Foreign Application Priority Data

Sep. 30, 2016 (CN) .......................... 2016 1 0876864
Oct. 13, 2016 (CN) .......................... 2016 1 0896430

(51) Int. Cl.
*H04N 19/52* (2014.01)
*H04N 19/182* (2014.01)
(Continued)

(52) U.S. Cl.
CPC ........... *H04N 19/52* (2014.11); *H04N 19/105* (2014.11); *H04N 19/176* (2014.11);
(Continued)

(58) Field of Classification Search
CPC combination set(s) only.
See application file for complete search history.

(56) References Cited

U.S. PATENT DOCUMENTS

2015/0341552 A1   11/2015   Chen et al.
2017/0214937 A1*  7/2017    Lin ...................... H04N 19/563

FOREIGN PATENT DOCUMENTS

CN    101521823 A    9/2009
CN    105681805 A    6/2016
(Continued)

OTHER PUBLICATIONS

Machine Translation and Abstract of International Publication No. WO2018041005, Part 1, Mar. 8, 2018, 15 pages.
(Continued)

*Primary Examiner* — William C Vaughn, Jr.
*Assistant Examiner* — Naod W Belai
(74) *Attorney, Agent, or Firm* — Conley Rose, P.C.

(57) ABSTRACT

Embodiments of this application provide a motion-compensated prediction method which includes determining a location that is of an initial reference pixel of a current pixel and that is in a reference image, where the current pixel is located in a first sub-image in the current image; when the initial reference pixel is located outside a second sub-image that is in the reference image and that is at a location corresponding to the first sub-image, determining, based on the location of the initial reference pixel, a location that is of a target reference pixel of the current pixel and that is in the reference image; and determining a prediction value of a pixel value of the current pixel based on a pixel value of the target reference pixel and/or a pixel value of a neighboring pixel of the target reference pixel.

24 Claims, 25 Drawing Sheets

(51) Int. Cl.
*H04N 19/547* (2014.01)
*H04N 19/597* (2014.01)
*H04N 19/176* (2014.01)
*H04N 19/85* (2014.01)
*H04N 19/105* (2014.01)

(52) U.S. Cl.
CPC ......... *H04N 19/182* (2014.11); *H04N 19/547* (2014.11); *H04N 19/597* (2014.11); *H04N 19/85* (2014.11)

(56) References Cited

FOREIGN PATENT DOCUMENTS

| CN | 105959702 A | 9/2016 |
|----|-------------|--------|
| JP | 2013046270 A | 3/2013 |
| WO | 2016064862 A1 | 4/2016 |
| WO | 2018041005 A1 | 3/2018 |

OTHER PUBLICATIONS

Machine Translation and Abstract of International Publication No. WO2018041005, Part 2, Mar. 8, 2018, 20 pages.
Smolic, A., et al., "Report on 3DAV Exploration," XP030012959, ISO/IEC JTC1/SC29/WG11 N5878, Jul. 26, 2003, 36 pages.
Jiang, K., et al., "Compression of cubic-panorama datasets with spatially consistent representation," XP031041913, IEEE International Workshop on Haptic Audio Visual Environments and their Applications, Jan. 2006, pp. 111-116.
Machine Translation and Abstract of Chinese Publication No. CN101521823, Sep. 2, 2009, 10 pages.
Machine Translation and Abstract of Chinese Publication No. CN105681805, Jun. 15, 2016, 19 pages.
Machine Translation and Abstract of Chinese Publication No. CN105959702, Sep. 21, 2016, 30 pages.
Foreign Communication From a Counterpart Application, PCT Application No. PCT/CN2017/104030, English Translation of International Search Report dated Dec. 20, 2017, 2 pages.
Foreign Communication From a Counterpart Application, PCT Application No. PCT/CN2017/104030, English Translation of Written Opinion dated Dec. 20, 2017, 5 pages.
Machine Translation and Abstract of Japanese Publication No. JP2013046270, Mar. 4, 2013, 25 pages.
Machine Translation and Abstract of International Publication No. WO2018041005, Part 1, Mar. 8, 2018, 15 pages.
Machine Translation and Abstract of International Publication No. WO2018041005, Part 2, Mar. 8, 2018, 20 pages.
Smolic, A., et al., "Report on 3DAV Exploration," XP030012959, ISO/IEC JTC1/SC29NVG11 N5878, Jul. 26, 2003, 36 pages.
Ma X., et al., "Co-projection-plane based motion compensated prediction for cubic format VR content," XP030150294, JVET-D0061, Oct. 5, 2016, 4 pages.
Jiang, K., et al., "Compression of cubic-panorama datasets with spatially consistent representation," XP031041913, IEEE International Workshop on Haptic Audio Visual Environments and their Applications, Nov. 4-5, 2006, pp. 111-116.
Heymann, S., et al., "Representation, Coding and Interactive Rendering of High-Resolution Panoramic Images and Video using MPEG-4," XP055034771, Proceedings Panoramic Photogrammetry Workshop, Feb. 28, 2005, 5 pages.
Foreign Communication From a Counterpart Application, European Application No. 17854950.7, Extended European Search Report dated Jun. 6, 2019, 11 pages.

* cited by examiner

US 10,779,000 B2

MOTION-COMPENSATED PREDICTION METHOD AND APPARATUS

CROSS-REFERENCE TO RELATED APPLICATIONS

This application is continuation application of PCT No. PCT/CN2017/104030, filed on Sep. 28, 2017, which claims priority to Chinese Patent Application No. 201610896430.5, filed on Oct. 13, 2016 and Chinese Patent Application No. 201610876864.9, filed on Sep. 30, 2016. The disclosures of the aforementioned applications are hereby incorporated by reference in their entireties.

TECHNICAL FIELD

This application relates to the image processing field, and more specifically, to a motion-compensated prediction method and device.

BACKGROUND

When a spherical panoramic image (a spherical image for short) is processed, generally, the spherical image is first projected to a two-dimensional planar panoramic image (a two-dimensional image for short) in a polyhedral format, and then encoding and decoding operations are performed on the two-dimensional image in the polyhedral format.

When motion-compensated prediction is performed for the two-dimensional image in the polyhedral format, generally, a location of a reference pixel of a current pixel is first determined, and then a pixel value of the current pixel is predicted based on a pixel value of the reference pixel. In a motion-compensated prediction process in some approaches, regardless of whether the reference pixel is located on a face on which the current pixel is located, the pixel value of the current pixel is predicted based on the pixel value at a location of the reference pixel. When the reference pixel is not on the face on which the current pixel is located, because all faces in the two-dimensional image in the polyhedral format are not on a same projection plane, a region in which the faces meet each other is deformed, causing a poor effect of predicting the pixel value of the current pixel based on the pixel value at the location of the reference pixel.

SUMMARY

This application provides a motion-compensated prediction method and a motion-compensated prediction apparatus, to improve a motion-compensated prediction effect.

According to a first aspect, a motion-compensated prediction method is provided, where the method includes determining a location that is of an initial reference pixel of a current pixel and that is in a reference image, where the current pixel is located in a first sub-image in the current image; when the initial reference pixel is located outside a second sub-image that is in the reference image and that is at a location corresponding to the first sub-image, determining, based on the location of the initial reference pixel and a location of a sphere center of a sphere corresponding to the reference image, a spherical reference location that is corresponding to a target reference pixel of the current pixel and that is on a surface of the sphere; determining, based on the spherical reference location, a polyhedral reference location that is corresponding to the target reference pixel and that is on a surface of a polyhedron corresponding to the reference image, where the sphere is internally tangent to the polyhedron, and a connection line between the polyhedral reference location and the sphere center passes through the spherical reference location; determining a location of the target reference pixel in the reference image based on the polyhedral reference location; and determining a prediction value of a pixel value of the current pixel based on a pixel value of the target reference pixel and/or a pixel value of a neighboring pixel of the target reference pixel.

When the initial reference pixel is located outside the second sub-image, due to geometric deformation on a boundary of a sub-image in a two-dimensional image, it is inaccurate to perform prediction for the current pixel directly based on the initial reference pixel. Therefore, in this case, in this application, the target reference pixel that can really play a reference role is found based on the location of the initial reference pixel, and then the pixel value of the current pixel is predicted based on the target reference pixel, thereby improving accuracy of motion-compensated prediction.

The second sub-image is a sub-image that is in the reference image and that is at the location corresponding to the first sub-image in the current image. For example, polyhedrons corresponding to the current image and the reference image each are a regular hexahedron, and the current image and the reference image each are in a 4×3 format. It is assumed that the first sub-image in the current image is corresponding to a bottom face of the regular hexahedron corresponding to the current image. In this case, the second sub-image in the reference image is also corresponding to a bottom face of the regular hexahedron corresponding to the reference image.

The polyhedron corresponding to the reference image may be placed on the reference image. In this case, an anchoring face of the polyhedron is a face on which a region of the second sub-image in the reference image is located. The anchoring face is a reference face used when the polyhedron is spread. For example, when the polyhedron is spread, a bottom face of the polyhedron is placed on a plane, and then other faces of the polyhedron are turned over to the plane. In this case, a location of the bottom face on the plane is unchanged, and the other faces of the polyhedron are turned over to other regions on the plane. In this case, the bottom face is the anchoring face of the polyhedron.

With reference to the first aspect, in some implementations of the first aspect, the determining, based on the location of the initial reference pixel and a location of a sphere center of a sphere corresponding to the reference image, a spherical reference location that is corresponding to a target reference pixel of the current pixel and that is on a surface of the sphere includes determining, based on the location of the initial reference pixel and an offset value of the location of the initial reference pixel relative to the second sub-image, a first location that is of the initial reference pixel and that is on a plane on which a first face of the polyhedron is located, where the first face is a face that is corresponding to the second sub-image and that is of the polyhedron; and determining, based on the first location and the location of the sphere center of the sphere, the spherical reference location that is corresponding to the target reference pixel and that is on the surface of the sphere, where a connection line between the first location and the location of the sphere center passes through the spherical reference location.

With reference to the first aspect, in some implementations of the first aspect, the method further includes determining, based on layout information of the reference image and the location of the initial reference pixel, whether the initial reference pixel is located outside the second sub-image in the reference image.

Whether the initial reference pixel is located outside the second sub-image in the reference image is determined such that when the initial reference pixel is not in the second sub-image, the pixel value of the current pixel is directly predicted based on the initial reference pixel, and there is no need to determine the target reference pixel based on the initial reference pixel.

With reference to the first aspect, in some implementations of the first aspect, the determining a location of the target reference pixel in the reference image based on the polyhedral reference location includes determining the location of the target reference pixel in the reference image based on the polyhedral reference location and layout information of the polyhedron.

With reference to the first aspect, in some implementations of the first aspect, the layout information includes at least one of face quantity information of the polyhedron, sub-image arrangement manner information of the reference image, sub-image arrangement order information of the reference image, and sub-image rotation information of the reference image.

With reference to the first aspect, in some implementations of the first aspect, the determining a prediction value of a pixel value of the current pixel based on a pixel value of the target reference pixel and/or a pixel value of a neighboring pixel of the target reference pixel includes determining the pixel value of the target reference pixel as the prediction value of the pixel value of the current pixel.

With reference to the first aspect, in some implementations of the first aspect, the determining a prediction value of a pixel value of the current pixel based on a pixel value of the target reference pixel and/or a pixel value of a neighboring pixel of the target reference pixel includes performing weighted processing on the pixel value of the target reference pixel and the pixel value of the neighboring pixel of the target reference pixel; and determining, as the prediction value of the pixel value of the current pixel, a pixel value that is at the location of the target reference pixel and that is obtained through weighted processing.

With reference to the first aspect, in some implementations of the first aspect, the determining a prediction value of a pixel value of the current pixel based on a pixel value of the target reference pixel and/or a pixel value of a neighboring pixel of the target reference pixel includes performing an interpolation operation at the location of the target reference pixel based on the pixel value of the neighboring pixel of the target reference pixel; and determining, as the prediction value of the pixel value of the current pixel, a pixel value obtained through the interpolation operation.

In some implementations, the current image and the reference image each are a two-dimensional image.

In some implementations, the determining, based on layout information of the reference image and the location of the initial reference pixel, whether the initial reference pixel is located outside the second sub-image in the reference image includes determining, based on the location of the initial reference pixel and a region in which the second sub-image in the reference image is located, whether the initial reference pixel is located outside the second sub-image in the reference image, where the region in which the second sub-image in the reference image is located is determined based on the layout information of the reference image.

In some implementations, a polyhedron corresponding to the two-dimensional image is a regular polyhedron. The regular polyhedron may include a regular tetrahedron, a regular hexahedron, a regular octahedron, a regular dodecahedron, and a regular icosahedron.

In some implementations, when the initial reference pixel is located in the second sub-image that is in the reference image and that is at the location corresponding to the first sub-image, the prediction value of the pixel value of the current pixel is determined based on a pixel value of the initial reference pixel.

When the initial reference pixel is located in the second sub-image, there is no need to search for the target reference pixel based on the initial reference pixel. Instead, the pixel value of the current pixel may be predicted directly based on the pixel value of the initial reference pixel. Only when the initial reference pixel is not located in the second sub-image (in this case, because a region in which sub-images are adjacent to each other in a two-dimensional image is deformed, the pixel value of the current pixel cannot be predicted directly based on the initial reference pixel), the target reference pixel needs to be searched for based on the location of the initial reference pixel.

According to a second aspect, a motion-compensated prediction method is provided, where the method includes determining a location that is of an initial reference pixel of a current pixel and that is in a reference image, where the current pixel is located in a first sub-image in the current image; when the initial reference pixel is located outside a second sub-image that is in the reference image and that is at a location corresponding to the first sub-image, determining a location that is of a target reference pixel of the current pixel and that is in an extended region of the second sub-image, where the extended region of the second sub-image is located outside the second sub-image, the extended region includes a plurality of pixels, a pixel value of a first pixel in the extended region is determined based on a pixel value of a second pixel in the reference image, a connection line between a sphere center and a polyhedral reference location that is corresponding to the second pixel and that is on a surface of a polyhedron corresponding to the reference image passes through a spherical reference location that is corresponding to the second pixel and that is on a sphere corresponding to the reference image, the spherical reference location is determined based on the location of the initial reference pixel and a location of the sphere center of the sphere, and the sphere is internally tangent to the polyhedron; and determining a prediction value of a pixel value of the current pixel based on a pixel value of the target reference pixel and/or a pixel value of a neighboring pixel of the target reference pixel.

When the initial reference pixel is located outside the second sub-image, due to geometric deformation on a boundary of a sub-image in a two-dimensional image, it is inaccurate to perform prediction for the current pixel directly based on the initial reference pixel. Therefore, in this case, in this application, the target reference pixel that can really play a reference role is found in the extended region directly based on the current pixel and motion information of the current pixel, and then the pixel value of the current pixel is predicted based on the target reference pixel such that the target reference pixel can be quickly found, and accuracy of motion estimation prediction can be improved.

It should be understood that the extended region of the second sub-image may be determined in advance based on the method in the first aspect.

With reference to the second aspect, in some implementations of the second aspect, the method further includes determining, based on a location of the first pixel and the location of the sphere center of the sphere corresponding to the reference image, the spherical reference location that is corresponding to the second pixel and that is on a surface of the sphere; determining, based on the spherical reference location, the polyhedral reference location that is corresponding to the second pixel and that is on the surface of the polyhedron corresponding to the reference image; and determining a location of the second pixel in the reference image based on the polyhedral reference location.

With reference to the second aspect, in some implementations of the second aspect, the determining, based on a location of the first pixel and the location of the sphere center of the sphere corresponding to the reference image, the spherical reference location that is corresponding to the second pixel and that is on a surface of the sphere includes determining, based on the location of the first pixel and an offset value of the location of the first pixel relative to the second sub-image, a first location that is of the first pixel and that is on a plane on which a first face of the polyhedron is located, where the first face is a face that is corresponding to the second sub-image and that is of the polyhedron; and determining, based on the first location and the location of the sphere center of the sphere, the spherical reference location that is corresponding to the second pixel and that is on the surface of the sphere, where a connection line between the first location and the location of the sphere center passes through the spherical reference location.

With reference to the second aspect, in some implementations of the second aspect, the method further includes determining, based on layout information of the reference image and the location of the initial reference pixel, whether the initial reference pixel is located outside the second sub-image in the reference image.

According to a third aspect, a motion-compensated prediction method is provided, where the method includes determining a location that is of an initial reference pixel of a current pixel and that is in a reference image, where the current pixel is located in a first sub-image in the current image; when the initial reference pixel is located outside a second sub-image that is in the reference image and that is at a location corresponding to the first sub-image, determining, based on the location of the initial reference pixel, a location that is of a target reference pixel of the current pixel and that is on a surface of a polyhedron corresponding to the reference image, where a connection line between the location, that is of the target reference pixel and that is on the surface of the polyhedron, and a location that is of the initial reference pixel and that is on a first plane passes through a body center of the polyhedron, and the first plane is a plane on which a face that is of the polyhedron and that is corresponding to the second sub-image is located; determining a location of the target reference pixel in the reference image based on the location that is of the target reference pixel and that is on the surface of the polyhedron; and determining a prediction value of a pixel value of the current pixel based on a pixel value of the target reference pixel in the reference image and/or a pixel value of a neighboring pixel of the target reference pixel.

When the initial reference pixel is located outside the second sub-image, due to geometric deformation on a boundary of a sub-image in a two-dimensional image, it is inaccurate to perform prediction for the current pixel directly based on the initial reference pixel. Therefore, in this case, in this application, the target reference pixel that can really play a reference role is found based on the location of the initial reference pixel, and then the pixel value of the current pixel is predicted based on the target reference pixel, thereby improving accuracy of motion-compensated prediction.

With reference to the third aspect, in some implementations of the third aspect, the determining, based on the location of the initial reference pixel, a location that is of a target reference pixel of the current pixel and that is on a surface of a polyhedron corresponding to the reference image includes determining, based on the location of the initial reference pixel and layout information of the reference image, the location that is of the initial reference pixel and that is on the first plane; and determining, based on the layout information of the reference image and the location that is of the initial reference pixel and that is on the first plane, the location that is of the target reference pixel and that is on the surface of the polyhedron.

With reference to the third aspect, in some implementations of the third aspect, the determining a location of the target reference pixel in the reference image based on the location that is of the target reference pixel and that is on the surface of the polyhedron includes determining the location of the target reference pixel in the reference image based on the location of the initial reference pixel and the layout information of the reference image, where the location that is of the target reference pixel and that is on the surface of the polyhedron is at a point at which the surface of the polyhedron is intersected with a connection line between the initial reference pixel and the body center of the polyhedron.

According to a fourth aspect, a motion-compensated prediction apparatus is provided, where the motion-compensated prediction apparatus includes a module configured to perform the method in the first aspect.

According to a fifth aspect, a motion-compensated prediction apparatus is provided, where the motion-compensated prediction apparatus includes a module configured to perform the method in the second aspect.

According to a sixth aspect, a motion-compensated prediction apparatus is provided, where the motion-compensated prediction apparatus includes a module configured to perform the method in the third aspect.

According to a seventh aspect, a codec is provided, including a non-volatile storage medium and a central processing unit, where the non-volatile storage medium stores an executable program, and the central processing unit is connected to the non-volatile storage medium, and executes the executable program to implement the motion-compensated prediction method provided in the first aspect of this application and expanded content of the method.

According to an eighth aspect, a codec is provided, including a non-volatile storage medium and a central processing unit, where the non-volatile storage medium stores an executable program, and the central processing unit is connected to the non-volatile storage medium, and executes the executable program to implement the motion-compensated prediction method provided in the second aspect of this application and expanded content of the method.

According to a ninth aspect, a codec is provided, including a non-volatile storage medium and a central processing unit, where the non-volatile storage medium stores an executable program, and the central processing unit is connected to the non-volatile storage medium, and executes the executable program to implement the motion-compensated prediction method provided in the third aspect of this application and expanded content of the method.

According to a tenth aspect, a computer readable medium is provided, where the computer readable medium stores program code to be executed by an image processing device, and the program code includes an instruction used to perform the method in the first aspect.

According to an eleventh aspect, a computer readable medium is provided, where the computer readable medium stores program code to be executed by an image processing device, and the program code includes an instruction used to perform the method in the second aspect.

According to a twelfth aspect, a computer readable medium is provided, where the computer readable medium stores program code to be executed by an image processing device, and the program code includes an instruction used to perform the method in the third aspect.

In this application, when the initial reference pixel is located outside the second sub-image, the target reference pixel that can really play a reference role is found based on the location of the initial reference pixel, and then the pixel value of the current pixel is predicted based on the target reference pixel, thereby improving accuracy of motion-compensated prediction.

DESCRIPTION OF EMBODIMENTS

The following describes technical solutions of this application with reference to accompanying drawings.

Figure 1:
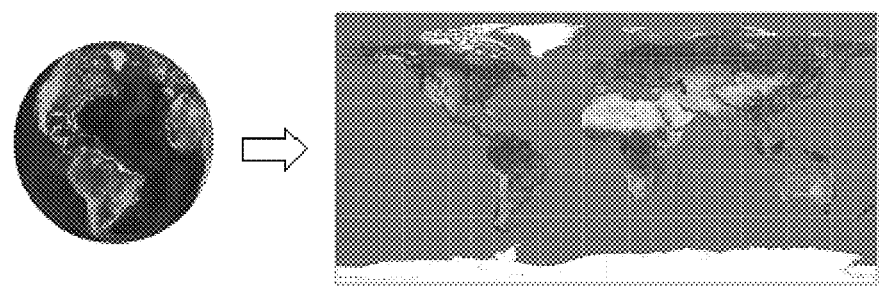
FIG. 1 is a longitude and latitude map of a spherical image.
Figure 2:
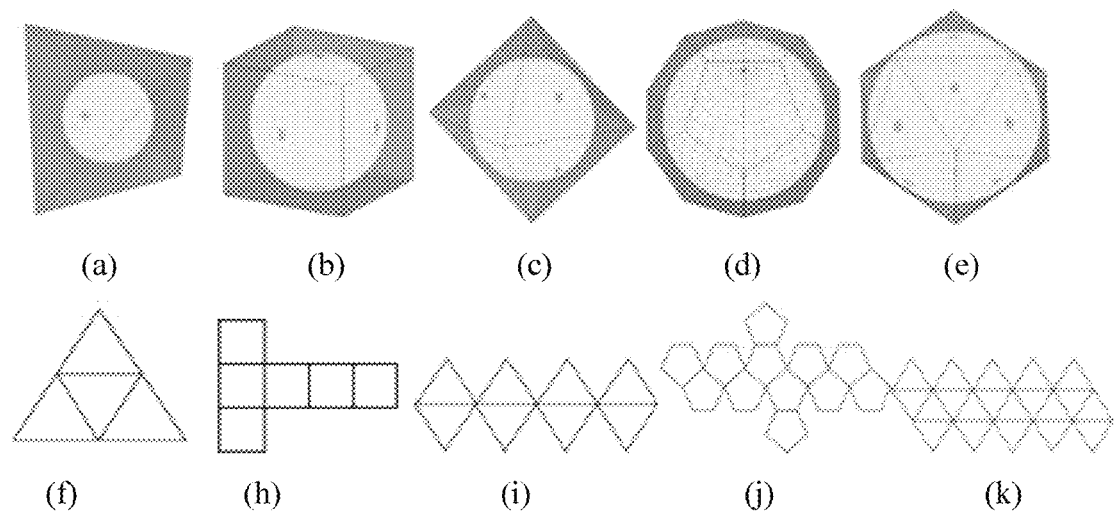
FIG. 2 is a two-dimensional image in a polyhedral format.
Figure 3:
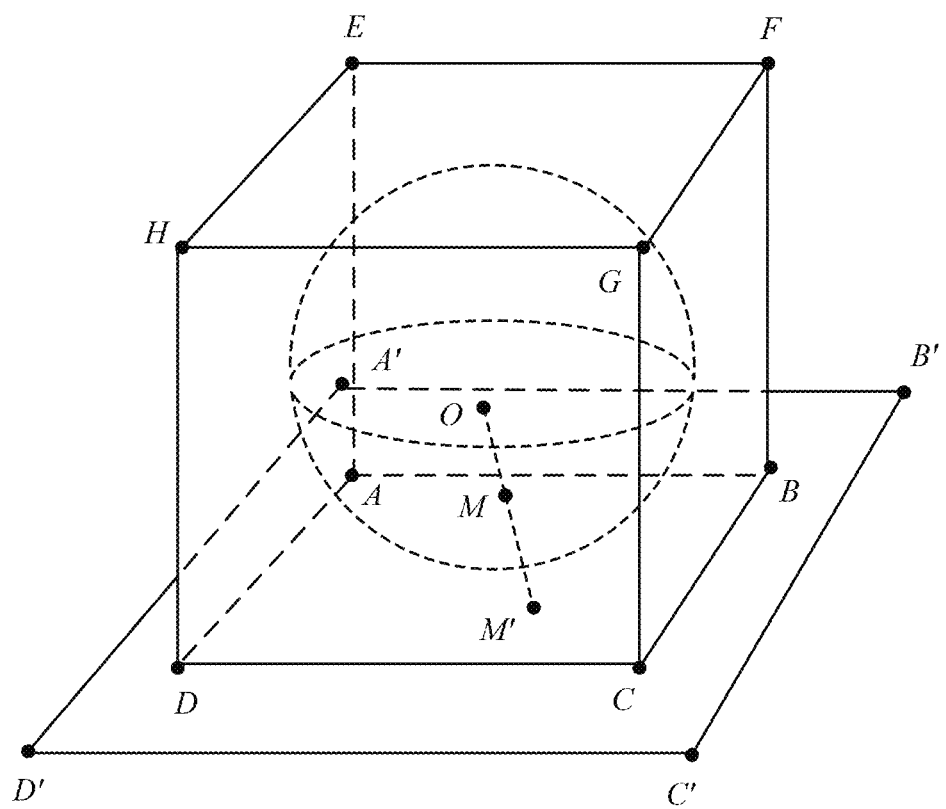
FIG. 3 is a schematic diagram of projecting a spherical image to a regular hexahedron.

To better understand a motion-compensated prediction method in embodiments of this application, with reference to FIG. 1 to FIG. 3, the following first briefly describes a scenario to which the motion-compensated prediction method in the embodiments of this application is applied.

To support content presentation of a video image in all directions, a virtual reality (VR) video image usually includes 360-degree omnidirectional visual information in three-dimensional space, and the VR video image may be imagined as a map obtained by viewing a globe from an internal center location of the globe. Typically, the VR video image may also be referred to as a panoramic video image (which may be briefly referred to as a spherical image).

Because the spherical image cannot be conveniently represented, stored, or indexed, before the spherical image is processed, the spherical image usually needs to be spread to obtain a two-dimensional image, and then operations such as compression, processing, storage, and transmission are performed on the two-dimensional image. A process of spreading the spherical image to obtain the two-dimensional image is referred to as projection.

As shown in FIG. 1, a common two-dimensional image is referred to as a longitude and latitude map. In FIG. 1, images in regions adjacent to the South Pole and the North Pole are stretched to a large extent, and therefore severe distortion and data redundancy exist.

To overcome a disadvantage in the longitude and latitude map, a spherical image may be projected to a polyhedron, to convert the spherical image into a two-dimensional image in a polyhedral format. For example, as shown in FIG. 2, the spherical image may be projected to a regular tetrahedron ((a) in FIG. 2), a regular hexahedron ((b) in FIG. 2), a regular octahedron ((c) in FIG. 2), a regular dodecahedron ((d) in FIG. 2), and a regular icosahedron ((e) in FIG. 2), and two-dimensional planar images obtained by projecting the spherical image to all the polyhedrons are successively shown in (f) to (k) in FIG. 2.

A specific process of projecting the spherical image to the polyhedron is as follows. The spherical image is placed in the polyhedron such that the spherical image becomes a sphere that is internally tangent to the polyhedron; a sphere center or a body center of the polyhedron and a point on a spherical surface are connected, and the connection line is prolonged to be intersected with the polyhedron; and a pixel at a location of the intersection point on the polyhedron is a pixel of a corresponding point in the spherical image.

With reference to FIG. 3, a process of projecting a spherical image to a regular hexahedron is used as an example below. The spherical image is internally tangent to the regular hexahedron ABCDEFGH. To obtain a pixel value at a point M' on the regular hexahedron, a sphere center O and M' are connected, and the connection line is intersected with a point M on a spherical surface. In this case, a pixel at the point M is a pixel at the point M'. Similarly, all pixels in a region ABCD on a plane A'B'C'D' may be obtained by using the same method. The pixels in the region ABCD form a face ABCD, and the plane A'B'C'D' is a projection plane of the face ABCD.

Figure 4:
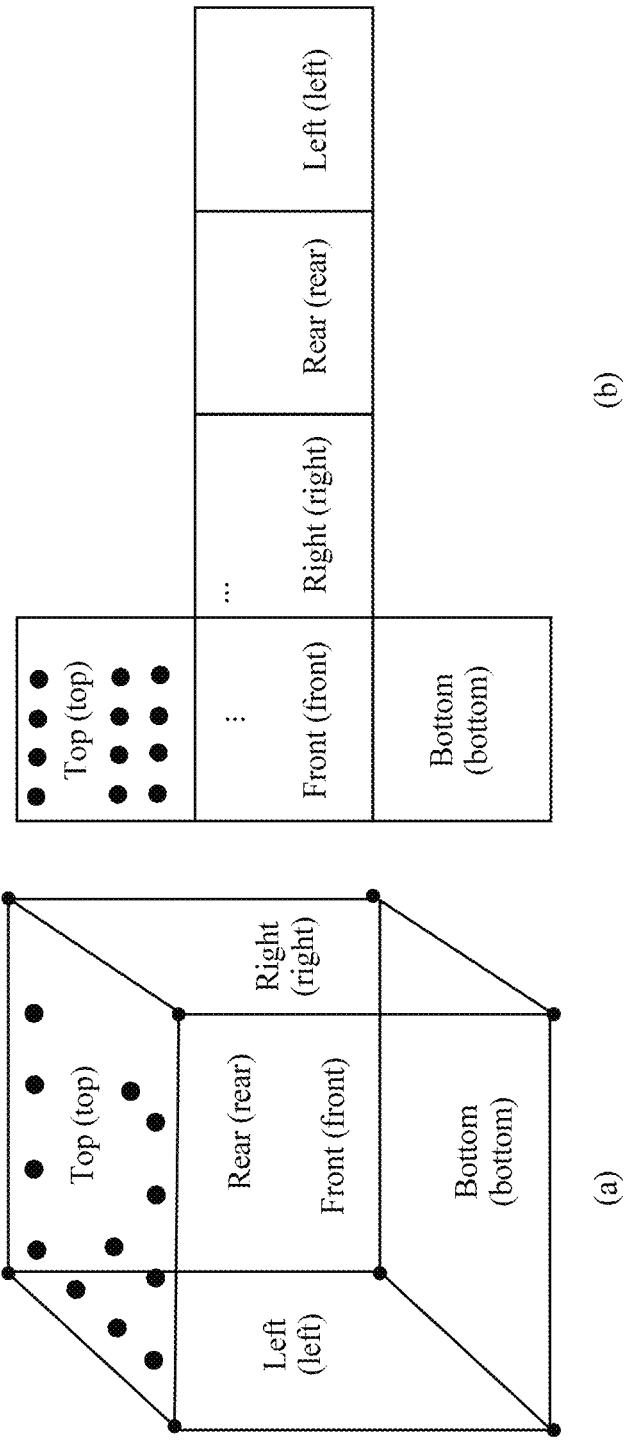
FIG. 4 is a schematic diagram of a regular hexahedron and a two-dimensional image obtained by spreading the regular hexahedron.

After the spherical image is projected to the polyhedron and then a surface of the polyhedron is spread to obtain a two-dimensional image, an image of each face on the surface of the polyhedron becomes an image of a region in the two-dimensional image or a sub-image in the spherical image. For example, a surface of a regular hexahedron in (a) in FIG. 4 is spread to obtain an image in (b) in FIG. 4, and a face image of a top face on the surface of the hexahedron becomes a sub-image in an upper left corner in (b) in FIG. 4. The sub-image is referred to as the face image of the top face in the regular hexahedron image, and the top face in the spherical image is a region covered by the face image of the top face. For any pixel on the top face, the top face is referred to as a face on which the pixel is located.

It should be understood that a face in the embodiments of this application is corresponding to a sub-image. For example, a bottom face is a face in a two-dimensional image, an image of the bottom face is a first sub-image, the bottom face is a face corresponding to the first sub-image, and the first sub-image is a sub-image corresponding to the bottom face. As shown in (h) in FIG. 2, each small rectangular region is a face in a two-dimensional image, and an image formed by pixels in each rectangular region is a sub-image in the two-dimensional image, that is, the face is a concept of a region, and the sub-image is an image.

In addition, when an operation such as encoding/decoding or compression is performed on the foregoing two-dimensional image, images shown in (f) to (k) in FIG. 2 may be directly processed, or an image in a rectangular region with a minimum size enclosed by the two-dimensional image may be selected as a processing object, and the rectangular region except a region including a face in the two-dimensional image is filled with default content or the like, for example, all gray, all black, or all white.

It should be understood that when an image is encoded/decoded, the image is usually divided into a plurality of equal-sized image blocks, and then a reference block is searched for each image block. In a process of searching for a reference block for a current image block, different reference cases may exist. Unidirectional prediction and bidirectional prediction may be included based on a reference direction. Unidirectional prediction means that the current block has one reference image set (an element in the set is a reference image selected from reconstructed images), and any reference image in the set may be selected for a coding block. Bidirectional prediction means that the current block has two reference image sets (elements in the two sets are separately images independently selected from reconstructed images, and reference images in the two sets may be partially or all the same), and a reference image in each of the two sets may be selected for a coding block. In an embodiment, using unidirectional prediction or bidirectional prediction and a method for constructing a reference image set are jointly agreed on between an encoder side and a decoder side, or an encoder side transmits a used method to a decoder side, and the decoder side determines the used method based on a decoding result. When the bidirectional prediction method is used, the current coding block has two reference blocks, and each reference block needs to be indicated by motion information of the reference block. The decoder side needs to determine the two reference blocks based on the two pieces of motion information obtained through decoding, and determines a prediction value of a pixel value of a pixel in the current block based on pixel values of pixels in the two reference blocks.

When the reference block of the current block is determined and prediction is performed for the current block based on the reference block, a reference pixel that is of a current pixel in the current block and that is in the reference block is determined, and then a prediction value of a pixel value of the current pixel is predicted based on a pixel value of the reference pixel. The following describes in detail the motion-compensated prediction method in the embodiments of this application.

Figure 5:
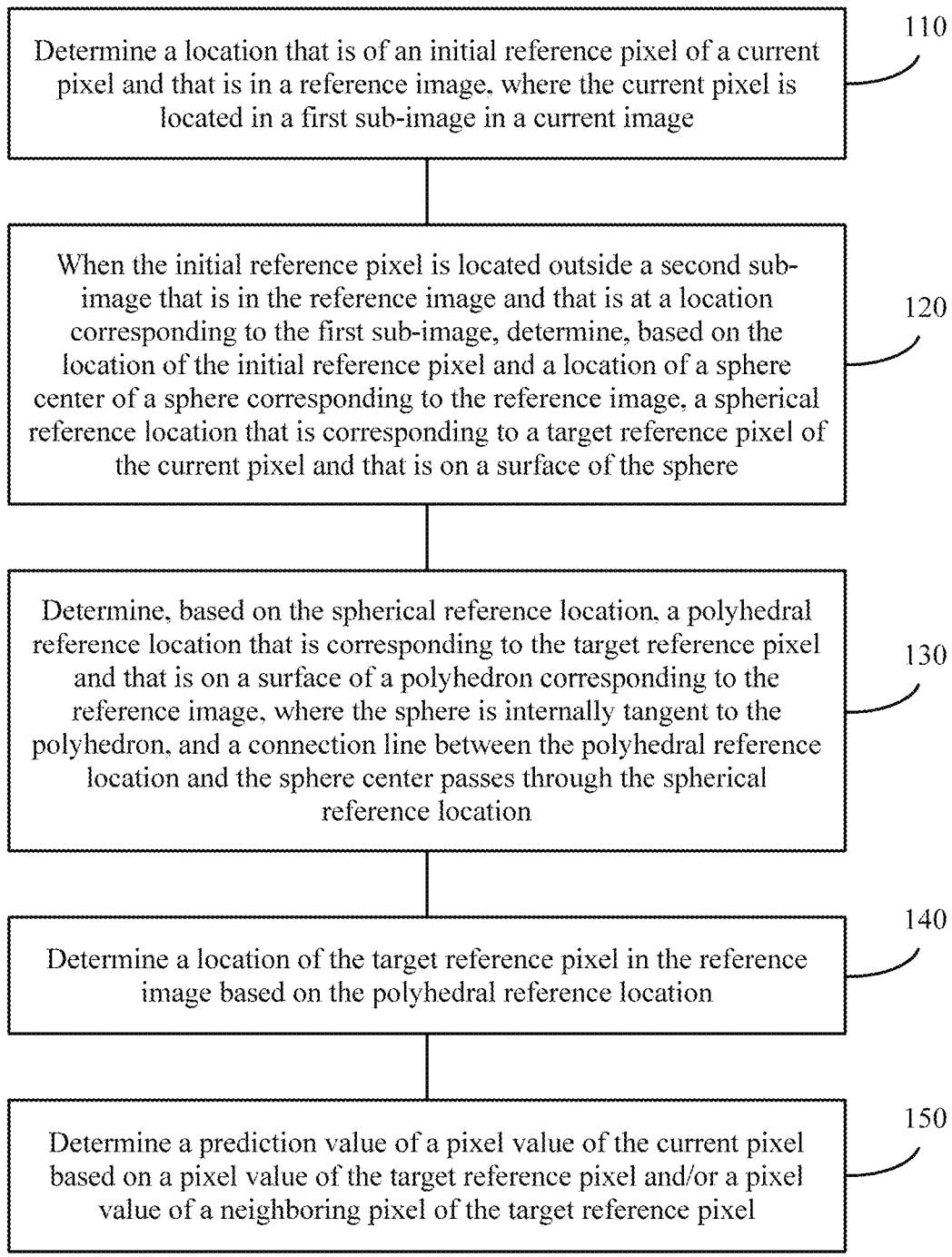
FIG. 5 is a schematic flowchart of a motion-compensated prediction method according to an embodiment of this application.

FIG. 5 is a schematic flowchart of a motion-compensated prediction method according to an embodiment of this application. The method includes the following steps.

110. Determine a location that is of an initial reference pixel of a current pixel and that is in a reference image, where the current pixel is located in a first sub-image in a current image.

It should be understood that the current image and the reference image each are a two-dimensional image that is in a polyhedral format and is obtained by converting a spherical image.

It should be understood that, when prediction processing is performed for the current image, the current image may be divided into a plurality of image blocks, and then each image block is processed. The foregoing current pixel may be a pixel in an image block in the current image. In an embodiment, the to-be-processed current pixel may be located in an image block in the first sub-image.

In an embodiment, a decoder may determine the location of the initial reference pixel in the reference image based on a location of the current pixel and motion information of the current pixel that is obtained by decoding a motion information bitstream. For example, the decoder determines the reference image based on reference image indication information in the motion information, and determines the location of the initial reference pixel in the reference image based on motion vector information in the motion information and the location of the current pixel. In a motion search process, when an encoder searches a reference image for a reference block for a current block or searches for a reference pixel for the current pixel, a location of a current pixel is the location of the initial reference pixel.

Figure 6:
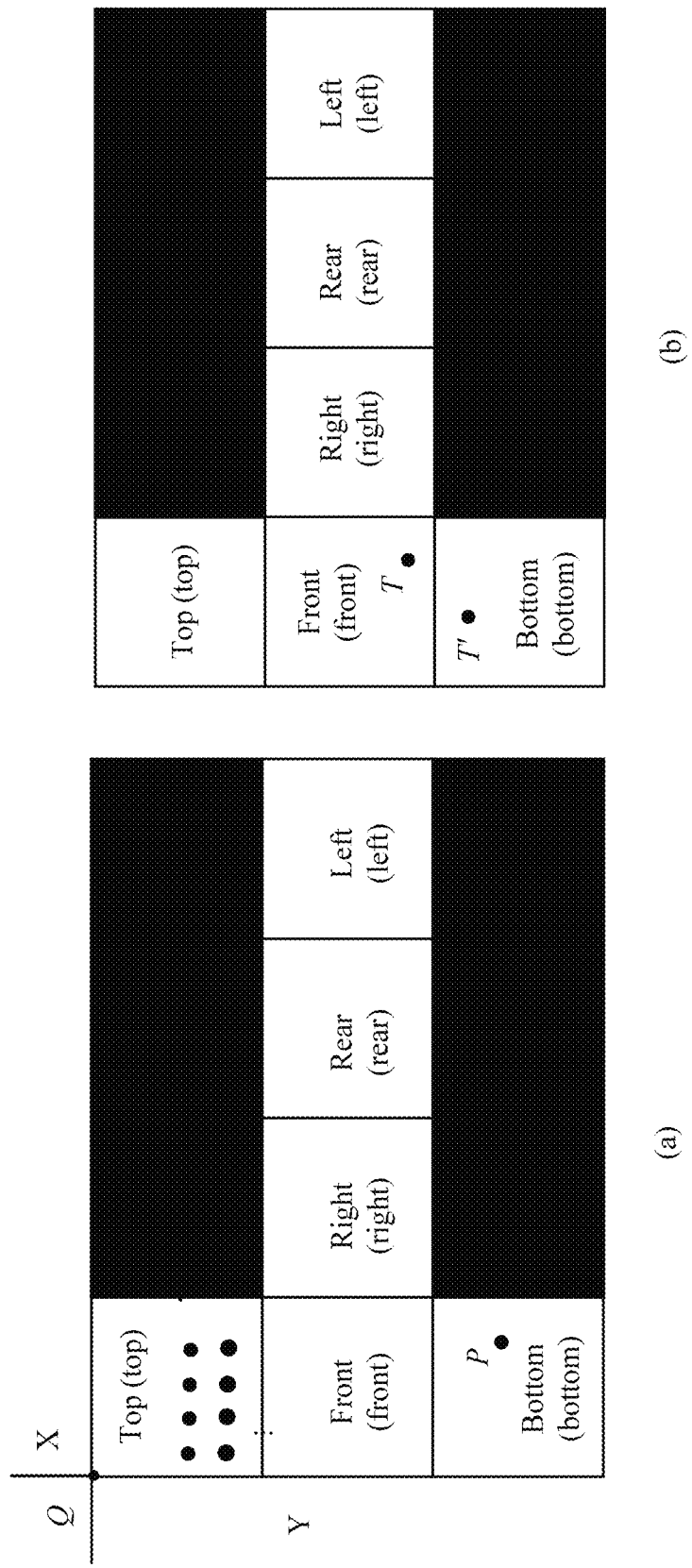
FIG. 6 is a schematic diagram of a current image and a reference image.

It is assumed that a polyhedron corresponding to each of the current image and the reference image is a regular hexahedron, where (a) in FIG. 6 shows the current image (the current pixel is in the current image), and (b) in FIG. 6 shows the reference image (the initial reference pixel is in the reference image). The current image and the reference image each include six sub-images. The six sub-images are respectively a top sub-image, a front sub-image, a right sub-image, a rear sub-image, a left sub-image, and a bottom sub-image. The sub-image herein may be considered as an array including some pixels, and these pixels are on a same projection plane when a spherical image is projected to the polyhedron. After the polyhedron is spread to obtain a two-dimensional image, each face of the polyhedron becomes a part of the two-dimensional image. It is assumed that the current pixel is P and P is in the bottom sub-image in the current image. It is assumed that the initial reference pixel is T and T is in the front sub-image in the reference image, in other words, T is not in the bottom sub-image in the reference image. It should be understood that, the first sub-image is the bottom sub-image in (a) in FIG. 6, a second sub-image is the bottom sub-image in (b) in FIG. 6, and the first sub-image and the second sub-image are sub-images that are in the current image and the reference image and that are at corresponding locations.

120. When the initial reference pixel is located outside a second sub-image that is in the reference image and that is at a location corresponding to the first sub-image, determine, based on the location of the initial reference pixel and a location of a sphere center of a sphere corresponding to the reference image, a spherical reference location that is corresponding to a target reference pixel of the current pixel and that is on a surface of the sphere.

130. Determine, based on the spherical reference location, a polyhedral reference location that is corresponding to the target reference pixel and that is on a surface of a polyhedron corresponding to the reference image, where the sphere is internally tangent to the polyhedron, and a connection line between the polyhedral reference location and the sphere center passes through the spherical reference location.

140. Determine a location of the target reference pixel in the reference image based on the polyhedral reference location.

To be specific, to determine the location of the target reference pixel in the reference image, first, the spherical reference location that is corresponding to the target reference pixel and that is on the surface of the sphere may be determined based on the location of the initial reference pixel; next, the polyhedral reference location that is corresponding to the target reference pixel and that is on the surface of the polyhedron is determined based on the spherical reference location; and the location of the target reference pixel in the reference image may be determined based on the polyhedral reference location.

Herein, it is not easy to directly determine the location of the target reference pixel in the reference image based on the location of the initial reference pixel. Instead, the sphere and the polyhedron that are corresponding to the reference image are used such that the location of the target reference pixel in the reference image can be determined step by step by using the spherical reference location and the polyhedral reference location.

It should be understood that, when the initial reference pixel is located in the second sub-image that is in the reference image and that is at the location corresponding to the first sub-image, prediction may be performed for the current pixel directly based on the initial reference pixel, and there is no need to search for the target reference pixel.

The polyhedron corresponding to the reference image may be a polyhedron formed by the reference image, namely, a polyhedron formed by folding all the sub-images in the reference image according to a specific rule.

Optionally, the method further includes determining, based on layout information of the reference image and the location of the initial reference pixel, whether the initial reference pixel is located outside the second sub-image in the reference image.

When whether the initial reference pixel is located outside the second sub-image is determined, the location of the initial reference pixel in the reference image needs to be determined first. For the decoder and the encoder, a specific process of determining the location of the initial reference pixel is as follows.

The decoder may determine the location of the initial reference pixel in the reference image based on the location of the current pixel and the motion information of the current pixel that is obtained by decoding the motion information bitstream. For example, the decoder may determine the reference image based on the reference image indication information in the motion information, and determine the location of the initial reference pixel in the reference image based on the motion vector information in the motion information and the location of the current pixel.

When the encoder searches for the reference block for the current block or searches for the reference pixel for the current pixel, the location of the current pixel is the location of the initial reference pixel.

Optionally, layout information of the polyhedron corresponding to the reference image includes at least one of face quantity information of the polyhedron corresponding to the reference image, sub-image arrangement manner information of the reference image, sub-image arrangement order information of the reference image, and sub-image rotation information of the reference image.

In an embodiment, the face quantity information of the polyhedron corresponding to the reference image may be a polyhedron corresponding to the reference image. Further, the face quantity information of the polyhedron may indicate that the reference image is corresponding to a regular hexahedron.

Figure 7:
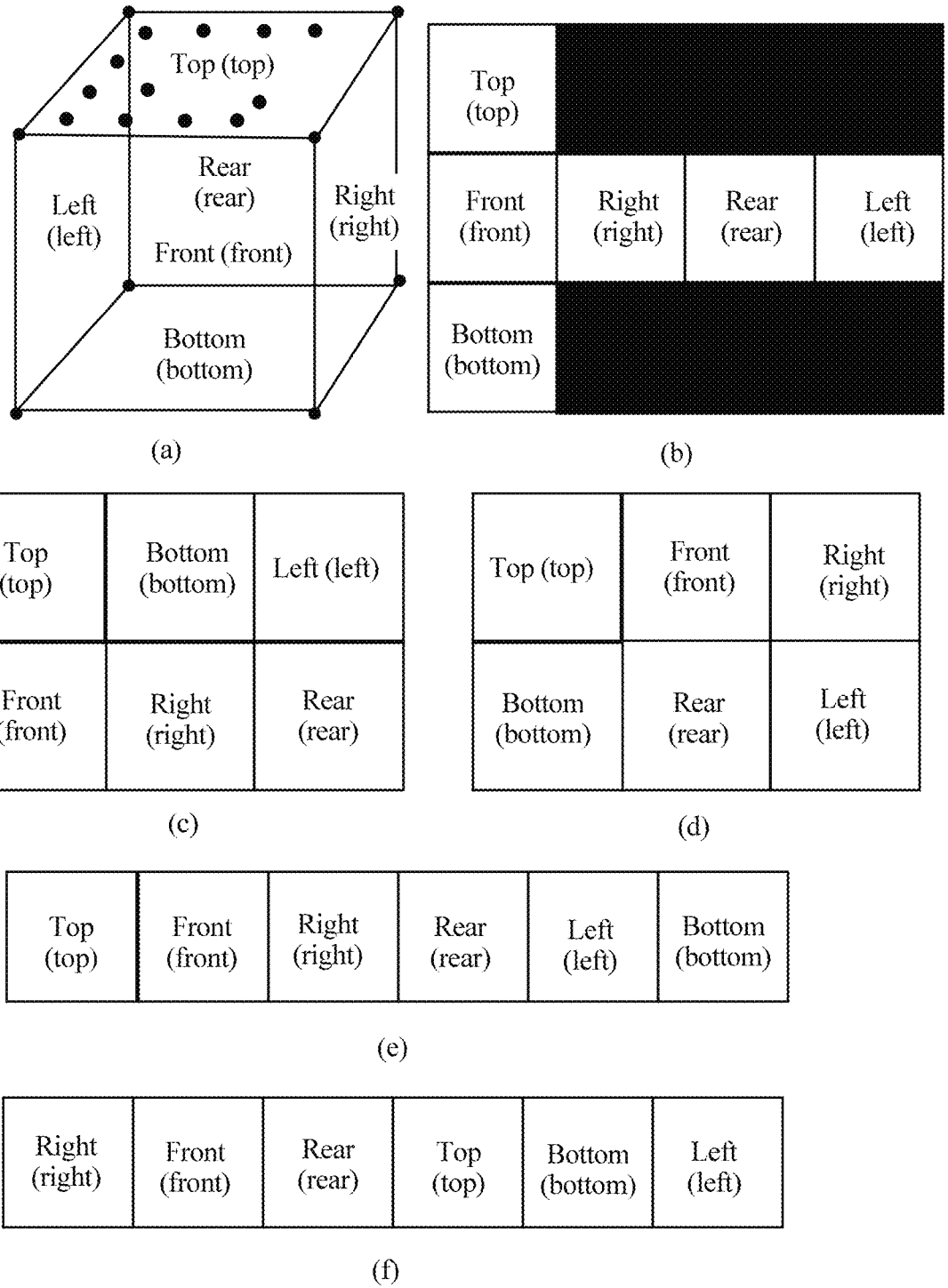
FIG. 7 is a schematic diagram of reference images in different layout formats.

The sub-image arrangement manner information of the reference image means an arrangement manner of all the sub-images in the reference image. As shown in FIG. 7, the reference image is corresponding to a regular hexahedron. In this case, the reference image includes six sub-images, and an arrangement manner of the six sub-images may be a 4×3 format ((b) in FIG. 7), a 3×2 format ((c) in FIG. 7 and (d) in FIG. 7), or a 6×1 format ((e) in FIG. 7 and (f) in FIG. 7).

The sub-image arrangement order information of the reference image means an arrangement order, in the reference image, of all the sub-images in the reference image. For example, (c) in FIG. 7 and (d) in FIG. 7 each show an image of the 3×2 format, where in (c) in FIG. 7, a sub-image corresponding to a front face is arranged in a lower left corner of the image, and in (d) in FIG. 7, a sub-image corresponding to a front face is arranged at a center location in the first column.

The sub-image rotation information of the reference image may mean a rotation angle of a sub-image in the reference image. It is assumed that a placement location of each sub-image in (c) in FIG. 7 is used as a reference location. In this case, in (d) in FIG. 7, a rotation angle of the sub-image corresponding to the front face is −90 degrees.

150. Determine a prediction value of a pixel value of the current pixel based on a pixel value of the target reference pixel and/or a pixel value of a neighboring pixel of the target reference pixel.

In this embodiment of this application, when the initial reference pixel is located outside the second sub-image, the target reference pixel that can really play a reference role is found based on the location of the initial reference pixel, and then the pixel value of the current pixel is predicted based on the target reference pixel, thereby improving accuracy of motion-compensated prediction.

Optionally, in an embodiment, the determining, based on the location of the initial reference pixel and a location of a sphere center of a sphere corresponding to the reference image, a spherical reference location that is corresponding to a target reference pixel of the current pixel and that is on a surface of the sphere includes determining, based on the location of the initial reference pixel and an offset value of the location of the initial reference pixel relative to the second sub-image, a first location that is of the initial reference pixel and that is on a plane on which a first face of the polyhedron is located, where the first face is a face that is corresponding to the second sub-image and that is of the polyhedron; and determining, based on the first location and the location of the sphere center of the sphere, the spherical reference location that is corresponding to the target reference pixel and that is on the surface of the sphere, where a connection line between the first location and the location of the sphere center passes through the spherical reference location.

It should be understood that the offset value of the location of the initial reference pixel relative to the second sub-image may be a location offset value of the location of the initial reference pixel relative to a point (such as a center point in the second sub-image) in the second sub-image.

The location of the initial reference pixel may be a location that is of the initial reference pixel and that is in a coordinate system of a plane on which the second sub-image is located. The first location may be a location that is corresponding to the initial reference pixel and that is in a coordinate system of a plane on which a first face of a polyhedron (the polyhedron is a polyhedron corresponding to the reference image) is located. The coordinate system of the plane on which the first face is located may be different from the coordinate system of the plane on which the second sub-image is located. Herein, a location that is of the initial reference pixel and that is in a coordinate system is converted into a location in another coordinate system. If the first face of the polyhedron corresponding to the reference image coincides with a face on which the second sub-image in the reference image is located, the location of the initial reference pixel coincides with the first location.

Figure 8:
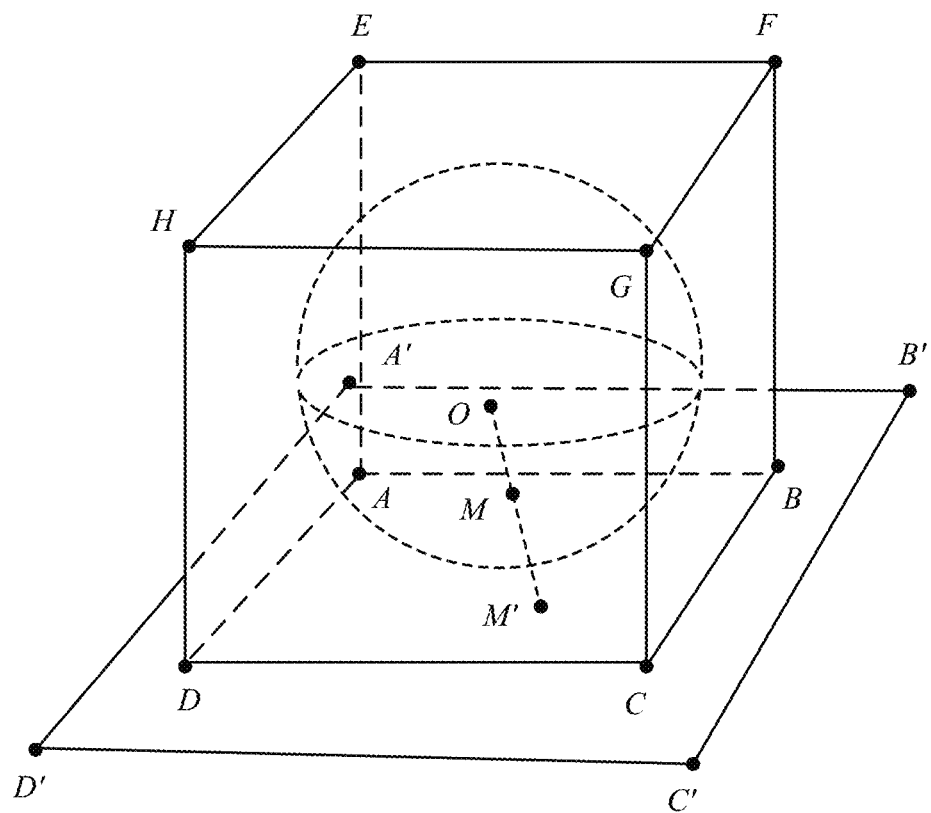
FIG. 8 is a schematic diagram of a polyhedron and a sphere that are corresponding to a reference image.

As shown in FIG. 8, a regular hexahedron corresponding to the reference image is ABCD-EFGH. A face ABCD of the regular hexahedron is corresponding to the second sub-image in the reference image. A plane on which the face ABCD is located is A'B'C'D'. A sphere corresponding to the reference image is internally tangent to the regular hexahedron ABCD-EFGH. A point M is a spherical reference location that is corresponding to the target reference pixel and that is on a surface of the sphere. A point M' is a polyhedral reference location that is corresponding to the target reference pixel and that is on the polyhedron. A location of the point M may be determined based on the first location (the first location is not shown in FIG. 8) of the initial reference pixel and a location of a sphere center O. A location of M' may be determined based on the location of the point M. Then, the location of the target reference pixel in the reference image may be determined based on the location of M'.

With reference to Embodiment 1, the following describes in detail how to determine the spherical reference location based on the location of the initial reference pixel and the location of the sphere center of the sphere.

Embodiment 1

Figure 9:
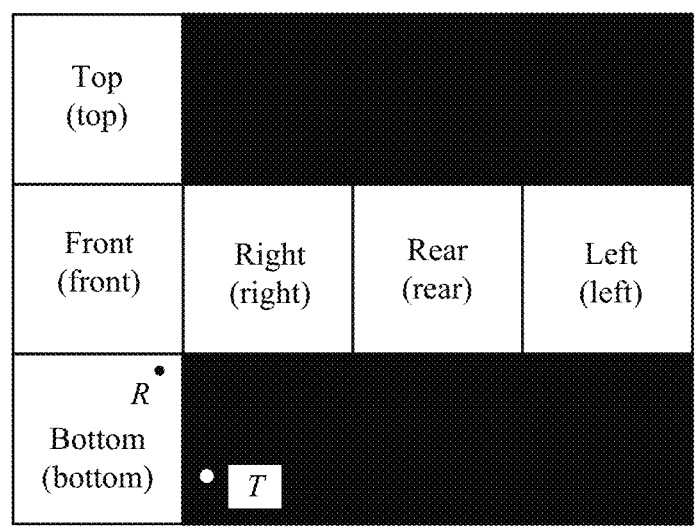
FIG. 9 is a schematic diagram of a reference image.
Figure 10:
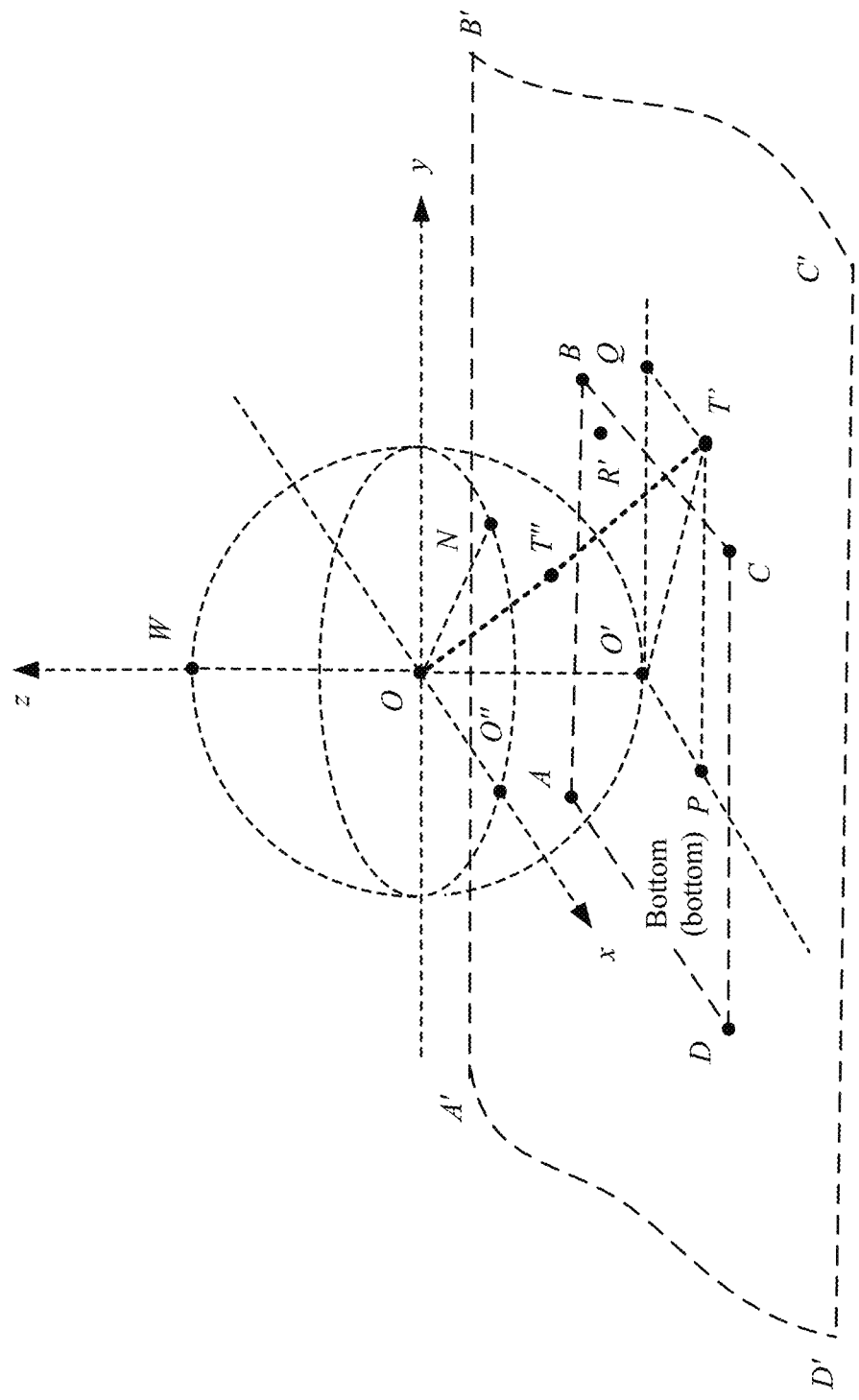
FIG. 10 is a schematic diagram of a sphere corresponding to a reference image.

As shown in FIG. 9, the reference image is a panoramic image of a hexahedron being arranged into a 4×3 format plane image, the initial reference pixel of the current pixel is T, the current pixel is in a bottom face in the current image, a point R is any point in a bottom face in the reference image, and a location of T and a location offset of T relative to R are already known. FIG. 10 shows a sphere corresponding to the reference image. The sphere is internally tangent to the polyhedron (the polyhedron is not shown in FIG. 10) corresponding to the reference image, the sphere is tangent to a bottom face of the polyhedron, and the bottom face of the polyhedron is corresponding to the bottom face in the reference image. A location of T' (namely, the first location of the initial reference pixel) may be determined based on the location of T and the offset value of T relative to R. In FIG. 10, A'B'C'D' is the plane on which the face ABCD is located, and a space rectangular coordinate system x-y-z is established by using the sphere center of the sphere as a coordinate origin. For ease of description, herein, it is specified that a plane x-O-y is parallel to the plane A'B'C'D', a projection pixel of the point O on the plane A'B'C'D' is O', O'Q is parallel to a y-axis, O'P is parallel to an x-axis, PT' is perpendicular to O'P, T'Q is perpendicular to O'Q, ON on a plane x-O-y is parallel to O'T', the first location of the initial reference pixel is T', and the spherical reference location that is corresponding to the target reference pixel and that is on the sphere is T''.

Because a sphere radius OO' is known, a location of the point T'' on the sphere may be determined based on a location of T'. In an embodiment, it is known that lengths of PT' and QT' and respectively $L_{PT'}$ and $L_{QT'}$, and therefore the following can be obtained from a geometric relationship in the figure:

$$L_{O'T'} = \sqrt{L_{QT'}^2 + L_{PT'}^2} \quad (1)$$

$$\angle PO'T' = \angle O''ON = \arctan\frac{L_{PT'}}{L_{QT'}} \quad (2)$$

$$\angle O'OT' = \pi - \angle WOT'' = \arctan\frac{L_{O'T'}}{L_{OO'}} \quad (3)$$

Because the radius of the sphere is known, the location of the point T'' may be determined based on the radius of the sphere, ∠O''ON, and ∠WOT'', that is, the spherical reference location that is corresponding to the target reference pixel and that is on the surface of the sphere is determined.

With reference to Embodiment 2, the following describes in detail how to determine, based on the spherical reference location, the polyhedral reference location that is corresponding to the target reference pixel and that is on the surface of the polyhedron.

Embodiment 2

Figure 11:
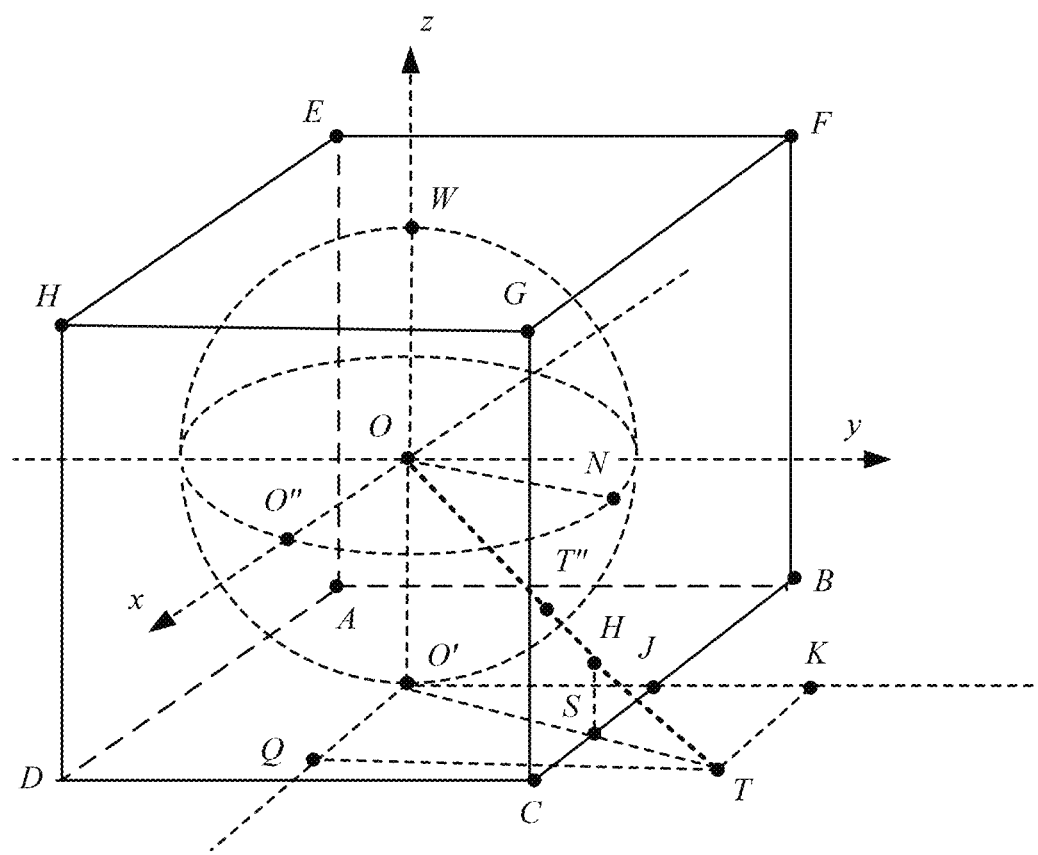
FIG. 11 is a schematic diagram of a polyhedron and a sphere that are corresponding to a reference image.

The spherical reference location has been determined in FIG. 10. Next, the polyhedral reference location is determined based on the spherical reference location. In FIG. 11, the polyhedron corresponding to the reference image is ABCD-EFGH. A prism of the polyhedron is a. O is a body center of the polyhedron. O' is a projection, of O, on the face ABCD. J is a midpoint on an edge BC. T'' is the spherical reference location. An extended line of OT'' is intersected with the polyhedron at a point H and is intersected with, at a point T, the plane on which the face ABCD is located. K is a vertical projection, of T, on an extended line of O'J. S is a vertical projection, of the point H, on edge BC. I is a vertical projection, of T, on the edge BC. For ease of description, it is assumed that the edge BC is parallel to the x-axis.

If lengths of SJ and SH are determined, a location of the point H may be determined, that is, the polyhedral reference location is determined. The following describes how to determine the lengths of SJ and SH.

It is known that a length $L_{OO'}$ of OO' and a length $L_{O'J}$ of O'J are both $$\frac{a}{2}.$$

In addition, because the location of T" is known, $\angle O'OT$ is also known and $\angle QO'T = \angle O''ON$. In this case, the following can be obtained:

$$\angle JO'S = 90° - \angle QO'T \tag{4}$$

$$L_{SJ} = L_{O'J} * \tan\angle JO'S \tag{5}$$

$$L_{O'T} = L_{OO'} * \tan\angle O'OT \tag{6}$$

$$L_{ST} = L_{O'T} - \sqrt{L_{SJ}^2 - L_{O'J}^2} \tag{7}$$

$$L_{SH} = \frac{L_{ST} * L_{OO'}}{L_{O'T}} \tag{8}$$

The lengths of SJ and SH can be obtained from formula (5) and formula (8). In this way, the location of the point H is determined, that is, the polyhedral reference location is determined.

It should be understood that in formula (8), $L_{SH}$ is determined based on $L_{ST}$, $L_{OO'}$, and $L_{O'T}$. $L_{SH}$ may also be determined according to another formula in addition to formula (8), and a specific process of determining $L_{SH}$ according to the other formula is as follows.

In FIG. 11, the following can be obtained based on a geometric relationship in which triangles are similar:

$$\frac{L_{SH}}{L_{OO'}} = \frac{L_{ST}}{L_{O'T}} \tag{a}$$

$$\frac{L_{ST}}{L_{O'T}} = \frac{L_{JK}}{L_{O'K}} \tag{b}$$

The following can be obtained from formula (a) and formula (b):

$$\frac{L_{SH}}{L_{OO'}} = \frac{L_{JK}}{L_{O'K}} \tag{c}$$

The following can further be derived from formula (c):

$$L_{SH} = \frac{L_{JK} * L_{OO'}}{L_{O'K}} \tag{d}$$

It can be learned from formula (d) that $L_{SH}$ may also be determined based on $L_{JK}$, $L_{OO'}$, and $L_{O'K}$.

With reference to Embodiment 2, the foregoing describes in detail how to determine the polyhedral reference location when the polyhedron corresponding to the reference image is a regular hexahedron. With reference to Embodiment 3 and Embodiment 4, the following describes in detail how to determine the polyhedral reference location when the polyhedron corresponding to the reference image is another polyhedron.

Embodiment 3

Figure 12:
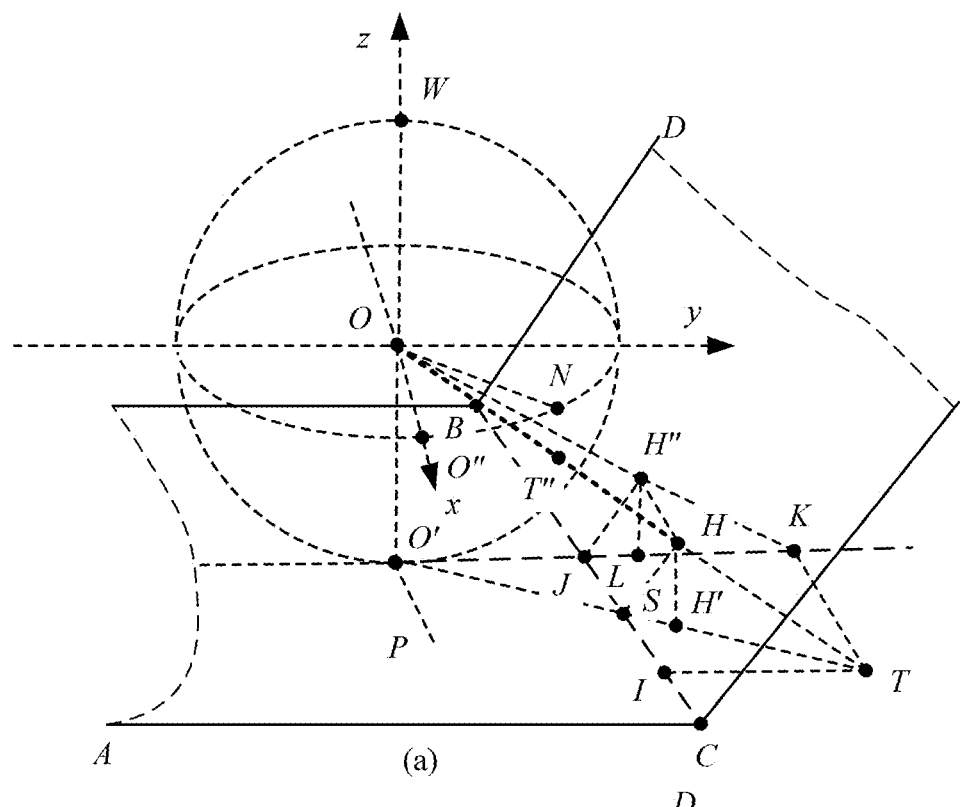
FIG. 12 is a schematic diagram of a polyhedron and a sphere that are corresponding to a reference image.
Figure 12:
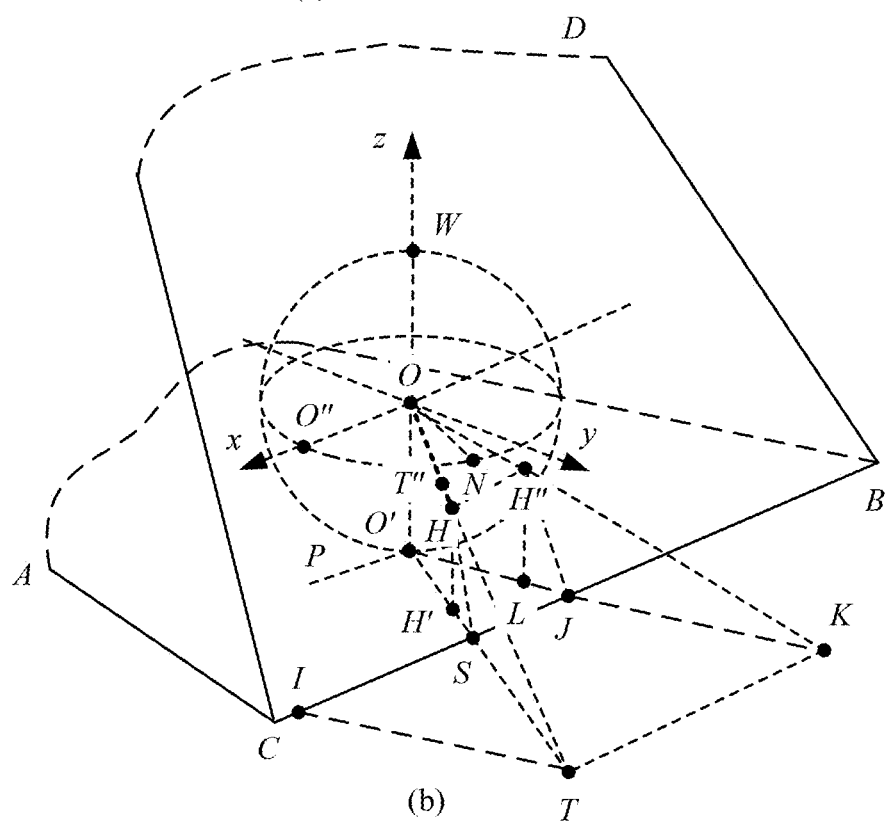

In FIG. 12, two polyhedrons are included. An included angle between adjacent faces of a polyhedron in (a) in FIG. 12 is greater than 90 degrees, and an included angle between adjacent faces of a polyhedron in (b) FIG. 12 is less than 90 degrees. In (a) in FIG. 12, the polyhedron corresponding to the reference image includes two faces ACB and DBC. An included angle between the face ACB and the face DBC is greater than 90 degrees (the polyhedron may further include other faces that are not listed herein one by one). The face ACB is a projection plane of the face on which the second sub-image in the reference image is located. An edge BC is an edge on which a neighboring face and the face on which the second sub-image is located meet each other. J is a point at which a vertical line O'K from O' to the edge BC is intersected with the edge BC. An extended line of OT" is intersected with the polyhedron at a point H and is intersected with, at a point T, a plane on which the face ACB is located. O'T is intersected with the edge BC at a point S. OT is intersected with the face BCD at the point H. H" is a vertical projection, of H, on O'K. L is a vertical projection, of H", on O'K.

Because a geometric shape of the polyhedron (including an edge length, an included angle between adjacent faces, a location of a body center, and the like) has been determined, a location of O' and a length of OO' are determined, and a location of J is also determined. If a length (which is equal to a length of HH") of SJ and a length of SH are determined, a location of the point H at which OT is intersected with the face BCD may be determined, that is, the polyhedral reference location that is corresponding to the target reference pixel and that is on the surface of the polyhedron is determined.

In an embodiment, it is known that the length of OO' is $L_{OO'}$, a length of O'J is $L_{O'J}$, and $\angle O'SH=\theta$, and $\angle TO'K$ and $\angle O'OT$ are known. Therefore, the following can be obtained from a geometric relationship:

$$L_{O'T} = L_{O'O} * \tan\angle O'OT \tag{8}$$

$$L_{KT} = L_{O'T} * \sin\angle TO'K \tag{9}$$

$$L_{JK} = L_{O'T} * \cos\angle TO'K - L_{O'J} \tag{10}$$

$$L_{O'K} = L_{O'J} + L_{JK} \tag{11}$$

$$L_{SJ} = \frac{L_{O'J} * L_{KT}}{L_{O'K}} \tag{12}$$

$$L_{O'T} = \sqrt{L_{O'K}^2 + L_{KT}^2} \tag{13}$$

$$L_{OT} = \sqrt{L_{O'O}^2 + L_{O'K} + L_{KT}^2} \tag{14}$$

$$L_{ST} = \frac{L_{JK}}{L_{O'K}} * L_{O'T} \tag{15}$$

$$L_{O'S} = \frac{L_{O'J}}{L_{O'K}} * L_{O'T} \tag{16}$$

-continued $$L_{SH'} = \frac{L_{OO'} * L_{ST}}{L_{O'T} * \tan(\pi - \theta) + L_{OO'}} \quad (17)$$

$$L_{O'H'} = L_{O'S} + L_{SH'} \quad (18)$$

$$L_{HH'} = \frac{L_{O'H'} * L_{KT}}{L_{O'T}} \quad (19)$$

$$L_{H''L} = \frac{L_{H'T} * L_{OO'}}{L_{O'T}} \quad (20)$$

$$L_{H''J} = \frac{L_{H''L}}{\sin(\pi - \alpha)} \quad (21)$$

$$L_{SJ} = \frac{L_{O'J} * L_{KT}}{L_{O'K}} \text{ and } L_{H''J} = \frac{L_{H''L}}{\sin(\alpha)}$$

can be finally obtained according to formulas (12) and (21), to obtain $L_{SJ}$ and $L_{H''J}$ such that the polyhedral reference location H can be determined.

In (b) in FIG. 12, an included angle between a face ACB and a face DBC of the polyhedron corresponding to the reference image is less than 90 degrees. In this case, the following can be obtained:

$$L_{SH'} = \frac{L_{OO'} * L_{ST}}{L_{O'T} * \tan(\theta) - L_{OO'}} \quad (22)$$

$$L_{O'H'} = L_{O'S} - L_{SH'} \quad (23)$$

$$L_{HH'} = \frac{L_{O'H'} * L_{KT}}{L_{O'T}} \quad (24)$$

$$L_{H''L} = \frac{L_{H'T} * L_{OO'}}{L_{O'T}} \quad (25)$$

$$L_{H''J} = \frac{L_{H''L}}{\sin(\alpha)} \quad (26)$$

$$L_{SJ} = \frac{L_{O'J} * L_{KT}}{L_{O'K}} \text{ and } L_{H''J} = \frac{L_{H''L}}{\sin(\alpha)}$$

can be finally obtained according to formulas (12) and (26), to obtain $L_{SJ}$ and $L_{H''J}$ such that the polyhedral reference location H can be determined.

It should be understood that, how to determine the spherical reference location based on the first location and then determine the polyhedral reference location based on the spherical reference location are described in Embodiment 1 and Embodiment 3. The polyhedral reference location may also be determined directly based on the first location. With reference to Embodiment 4 and Embodiment 5, the following describes in detail how to determine the polyhedral reference location (namely, a location that is obtained by projecting the target reference pixel on the surface of the polyhedron) directly based on the first location.

Embodiment 4

Figure 13:
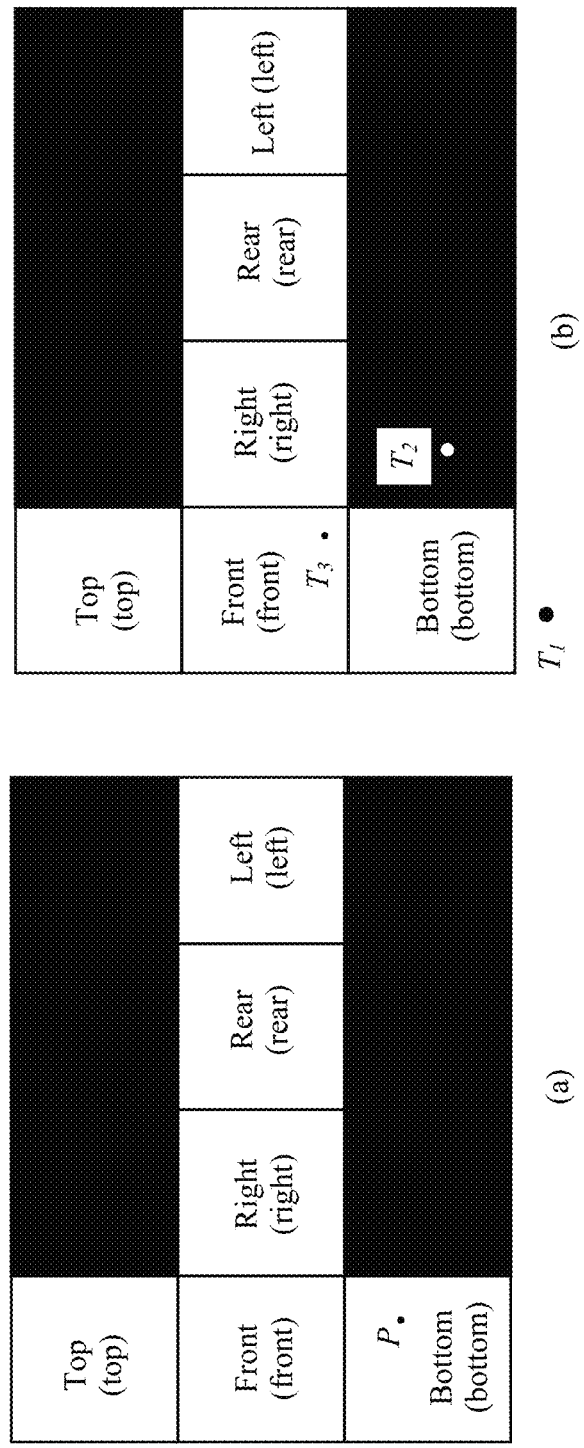
FIG. 13 is a schematic diagram of a current image and a reference image.

In FIG. 13, (a) in FIG. 13 shows the current image, (b) in FIG. 13 shows the reference image, P is the current pixel in the current image, P is located on a bottom face in the current image, P' is a pixel that is in the reference image and is at a same location as P, P' is located on a bottom face in the reference image, and $T_1$, $T_2$, and $T_3$ are all initial reference pixels of the current pixel, and are all located outside the bottom face in the reference image.

Figure 14:
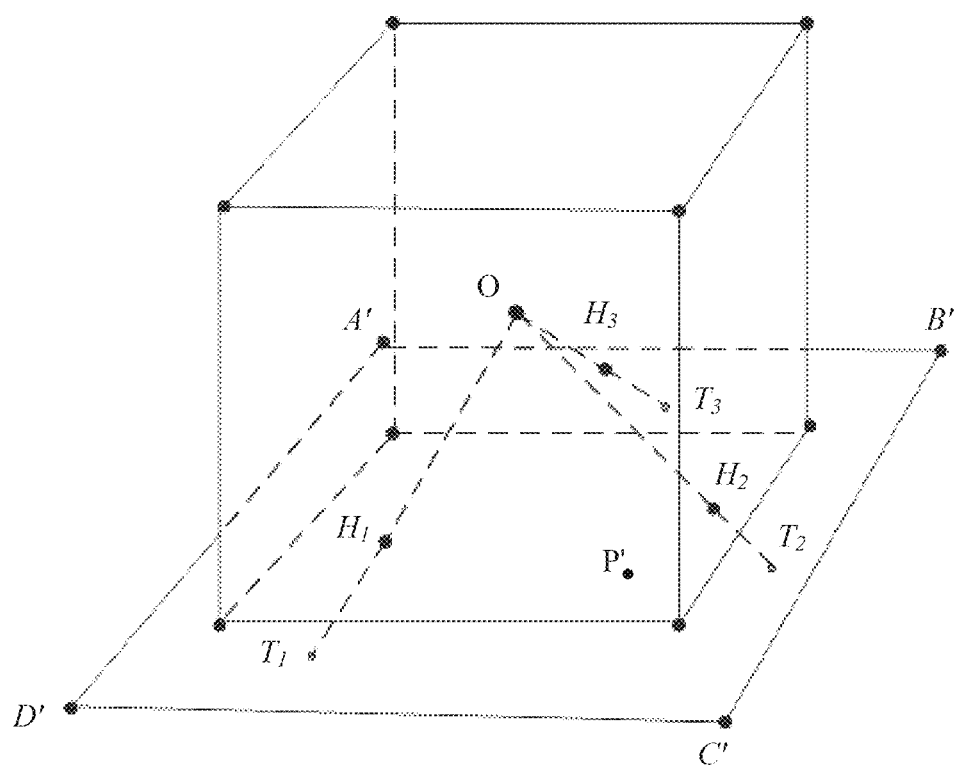
FIG. 14 is a schematic diagram of a regular hexahedron corresponding to a reference image.

A regular hexahedron in FIG. 14 is a polyhedron that is corresponding to the reference image and is constructed by using the bottom face in the reference image as the bottom. FIG. 14 shows three current pixels $T_1$, $T_2$, and $T_3$ in (b) in FIG. 13. It can be learned from FIG. 14 that, pixels that are corresponding to three target reference pixels and are on the regular hexahedron are respectively $H_1$, $H_2$, and $H_3$. $H_1$, $H_2$, and $H_3$ are at locations of points at which the regular hexahedron is intersected with connection lines between a point O and $T_1$, $T_2$, and $T_3$. In this way, locations of $H_1$, $H_2$, and $H_3$ can be determined based on locations of $T_1$, $T_2$, and $T_3$. It should be understood that, in FIG. 14, $T_1$, $T_2$, and $T_3$ show only a case in which initial reference pixels are at different locations. Only one reference pixel exists at a time.

Figure 15:
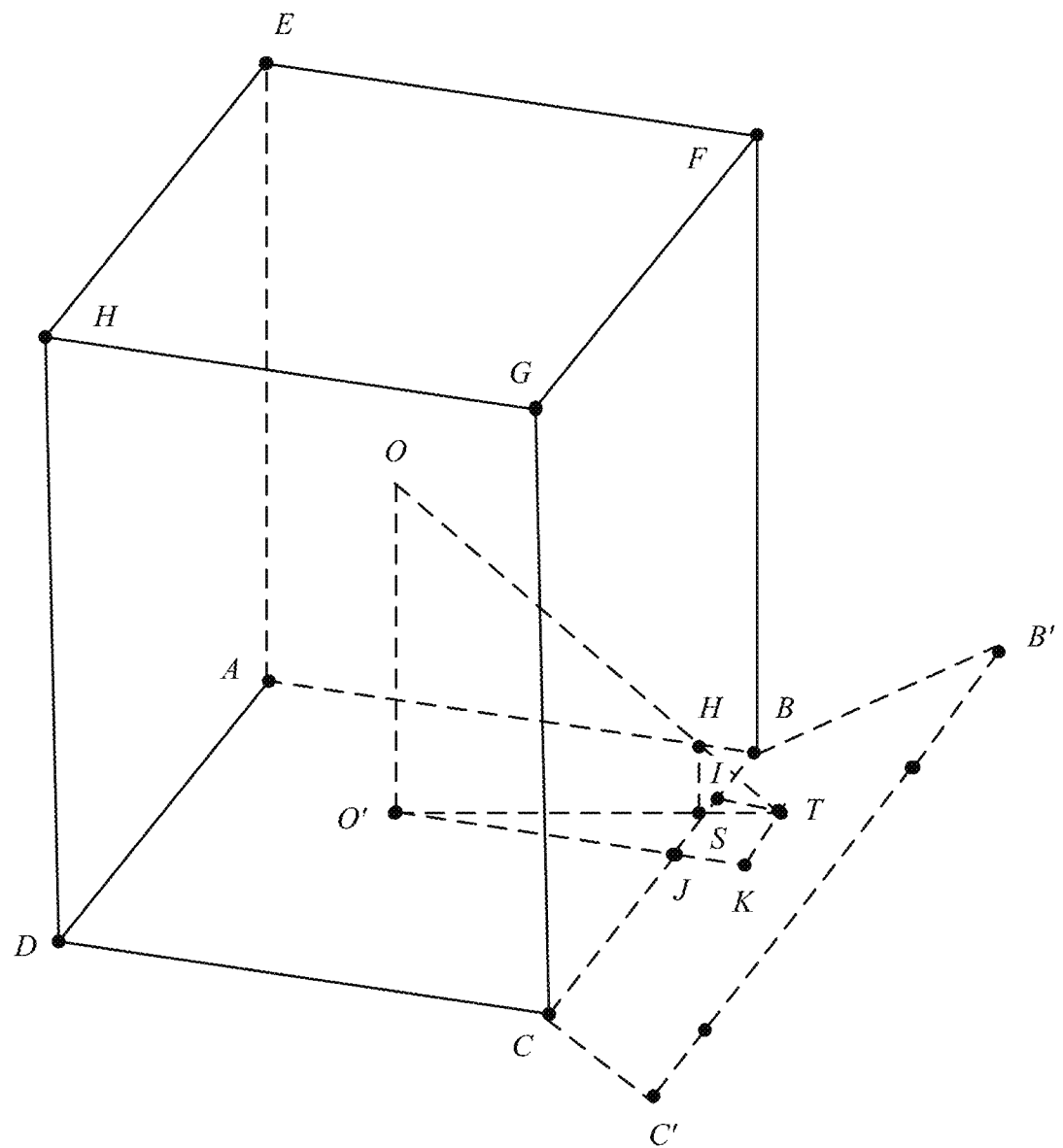
FIG. 15 is a schematic diagram of a regular hexahedron corresponding to a reference image.

The following uses FIG. 15 as an example to describe in detail how to determine, based on the location of the initial reference pixel, a location of a pixel that is on a polyhedron and that is corresponding to the target reference pixel.

In an embodiment, $T_1$ is used as an example to describe in detail how to determine, based on a location of $T_1$, a location of a projection pixel that is obtained by projecting the target reference pixel to the surface of the polyhedron.

A regular hexahedron in FIG. 15 is a polyhedron that is corresponding to the reference image and is constructed by using the bottom face in the reference image as the bottom, that is, an anchoring face (the anchoring face may be understood as the bottom during construction of the polyhedron, for example, if a face in the reference image is used as the bottom of the constructed polyhedron, the bottom is the anchoring face of the polyhedron) of the regular hexahedron is the bottom face in the reference image. A prism of the regular hexahedron is a. O is a body center of the regular hexahedron. A location of T is the location of the initial reference pixel. A face ABCD is a face on which a pixel that is in the reference image and that is at a same location as the current pixel is located. O' is a vertical projection obtained by projecting O on the face ABCD in a face normal direction on a projection plane of the face ABCD on which the current pixel is located. J is a midpoint on an edge BC. K is a vertical projection, of T, on an extended line of O'J. OT is intersected with a face BCGF at a point H (a location of the point H is a location of a projection pixel of the initial reference pixel). A vertical projection, of the point H, on the edge BC is S. I is a vertical projection, of T, on the edge BC. Because the prism of the regular hexahedron is a, lengths of OO' and O'J are both $$\frac{a}{2}.$$

It is assumed that a length of a line segment JK is x and a length of a line segment KT is y. In this case, the following can be obtained based on similarity of triangles:

$$L_{SJ} = \frac{a/2 * y}{a/2 + x} \quad (27)$$

$$L_{SH} = \frac{a/2 * \sqrt{x^2 + \left(\frac{xy}{a/2 + x}\right)^2}}{\sqrt{(x + a/2)^2 + y^2}} \quad (28)$$

$L_{SJ}$ is a length of SJ, and $L_{SH}$ is a length of SH. After the lengths of SJ and SH are obtained according to formulas (27) and (28), the location of the point H on a surface of the regular hexahedron can be determined. It should be understood that the lengths of SJ and SH may be determined based on location coordinates of the initial reference pixel, to obtain the location of the point H on the surface of the regular hexahedron.

Further, formula (28) may be simplified to obtain the following formula:

$$L_{SH} = \frac{a/2 * x}{a/2 + x} \quad (e)$$

In addition, in FIG. 15, formula (e) may further be directly obtained based on the geometric relationship in which triangles are similar, and a specific process is as follows.

The following can be obtained based on the geometric relationship in which triangles are similar:

$$\frac{L_{SH}}{L_{OO'}} = \frac{L_{ST}}{L_{O'T}} \quad (f)$$

$$\frac{L_{ST}}{L_{O'T}} = \frac{L_{JK}}{L_{O'K}} \quad (g)$$

The following can be obtained from formula (f) and formula (g):

$$\frac{L_{SH}}{L_{OO'}} = \frac{L_{JK}}{L_{O'K}} \quad (h)$$

Because the length of OO' is $$\frac{a}{2},$$

and the length of JK is x, formula (e) can be obtained by substituting a length $$\frac{a}{2}$$

+x of O'K into formula (h).

Embodiment 5

Figure 16:
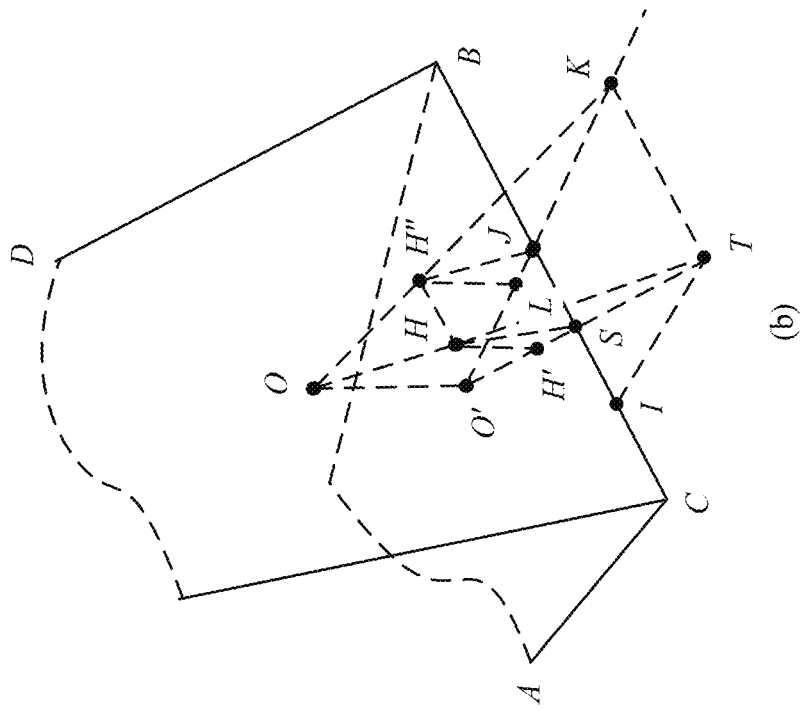
FIG. 16 is a schematic diagram of another polyhedron corresponding to a reference image.
Figure 16:
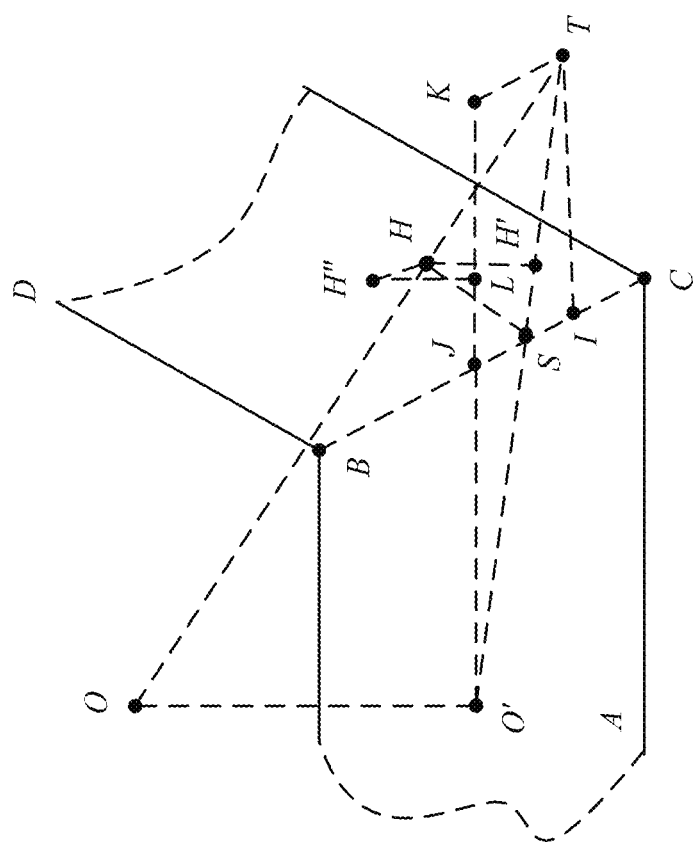

As shown in FIG. 16, a polyhedron corresponding to the reference image includes two faces ACB and DBC (the polyhedron may further include other faces that are not listed herein one by one). The face ACB is a face on which a pixel that is in the reference image and that is at a same location as the current pixel is located. O is a body center of the polyhedron. O' is a vertical projection, of O, on the face ABC. A location of T is the location of the initial reference pixel. O'T is intersected with an edge BC at a point S. OT is intersected with the face BCD at a point H. H" is a vertical projection, of H, on O'K. L is a vertical projection, of H", on O'K. I is a vertical projection, of T, on the edge BC.

As shown in (a) in FIG. 16, it is known that a length of OO' is $L_{OO'}$, a length of O'J is $L_{O'J}$, a length of JK is $L_{JK}$, a length of KT is $L_{KT}$, an included angle between the face ACB and the face BCD is α (α is greater than 90°), and ∠O'SH=θ. In this case, the following can be obtained:

$$L_{O'K} = L_{O'J} + L_{JK} \quad (29)$$

$$L_{SJ} = \frac{L_{O'J} * L_{KT}}{L_{O'K}} \quad (30)$$

$$L_{O'T} = \sqrt{L_{O'K}^2 + L_{KT}^2} \quad (31)$$

$$L_{OT} = \sqrt{L_{O'O}^2 + L_{O'K}^2 + L_{KT}^2} \quad (32)$$

$$L_{ST} = \frac{L_{JK}}{L_{O'K}} * L_{O'T} \quad (33)$$

$$L_{O'S} = \frac{L_{O'J}}{L_{O'K}} * L_{O'T} \quad (34)$$

$$L_{SH'} = \frac{L_{OO'} * L_{ST}}{L_{O'T} * \tan(\pi - \theta) + L_{OO'}} \quad (35)$$

$$L_{O'H'} = L_{O'S} + L_{SH'} \quad (36)$$

$$L_{HH'} = \frac{L_{O'H'} * L_{KT}}{L_{O'T}} \quad (37)$$

$$L_{H''L} = \frac{L_{H'T} * L_{OO'}}{L_{O'T}} \quad (38)$$

$$L_{H''J} = \frac{L_{H''L}}{\sin(\pi - \alpha)} \quad (39)$$

When an included angle between adjacent faces of the polyhedron is greater than 90°, $$L_{SJ} = \frac{L_{O'J} * L_{KT}}{L_{O'K}} \text{ and } L_{H''J} = \frac{L_{H''J}}{\sin(\pi - \alpha)}$$

can be finally obtained according to formulas (30) and (39), to obtain $L_{SJ}$ and $L_{H''J}$ such that the location that is obtained by projecting the target reference pixel to the surface of the polyhedron can be determined.

In (b) in FIG. 16, an included angle α between the face ACB and the face BCD is less than 90°. In this case, the following can be obtained:

$$L_{SH'} = \frac{L_{OO'} * L_{ST}}{L_{O'T} * \tan(\theta) - L_{OO'}} \quad (40)$$

$$L_{O'H'} = L_{O'S} - L_{SH'} \quad (41)$$

$$L_{HH'} = \frac{L_{O'H'} * L_{KT}}{L_{O'T}} \quad (42)$$

$$L_{H''L} = \frac{L_{H'T} * L_{OO'}}{L_{O'T}} \quad (43)$$

$$L_{H''J} = \frac{L_{H''L}}{\sin(\alpha)} \quad (44)$$

When an included angle between adjacent faces of the polyhedron is less than 90°, $$L_{SJ} = \frac{L_{O'J} * L_{KT}}{L_{O'K}} \text{ and } L_{H''J} = \frac{L_{H''L}}{\sin(\alpha)}$$

can be finally obtained according to formulas (30) and (44), to obtain $L_{SJ}$ and $L_{H''J}$ such that the location that is obtained by projecting the target reference pixel to the surface of the polyhedron can be determined.

It should be understood that the formulas in Embodiment 5 are relatively similar to the formulas in Embodiment 3. In the process of calculating $L_{SJ}$ and $L_{H''J}$ in Embodiment 3, a spherical angle parameter of the spherical reference location T" is used. In Embodiment 5, a final result is directly derived without using J". In both of the two implementations, the polyhedral reference location that is corresponding to the target reference pixel and that is on the surface of the polyhedron can be determined.

In terms of a common polyhedron, an included angle between adjacent faces of a tetrahedron is less than 90°, an included angle between adjacent faces of a regular hexahedron is 90°, and an included angle between adjacent faces of a regular octahedron and a more complex polyhedron is greater than 90°. For an image in another polyhedral format, a corresponding parameter may be obtained based on a similar method, to finally obtain $L_{SJ}$ and $H_{H''J}$ such that the location of the projection pixel that is obtained by projecting the target reference pixel to the surface of the polyhedron can be determined. It should be understood that the location of the projection pixel herein is a location of a point at which the surface of the polyhedron is intersected with a connection line between the initial reference pixel and the body center of the polyhedron.

Optionally, in an embodiment, the determining a location of the target reference pixel in the reference image based on the polyhedral reference location includes determining the location of the target reference pixel in the reference image based on the polyhedral reference location and layout information of the polyhedron.

Optionally, a point that is corresponding to the target reference pixel and that is at a location on the surface of the polyhedron may be understood as the projection pixel of the target reference pixel. In this way, the determining, based on the location of the initial reference pixel, the location that is of the target reference pixel of the current pixel and that is in the reference image includes determining, based on the location of the initial reference pixel and the layout information of the reference image, a location of a projection pixel that is of the initial reference pixel and is on the surface of the polyhedron, where the location of the projection pixel on the surface of the polyhedron is at a point at which the surface of the polyhedron is intersected with the connection line between the initial reference pixel and the body center of the polyhedron; and determining the location of the target reference pixel in the reference image based on the location of the projection pixel on the surface of the polyhedron and the layout information of the reference image.

Figure 17:
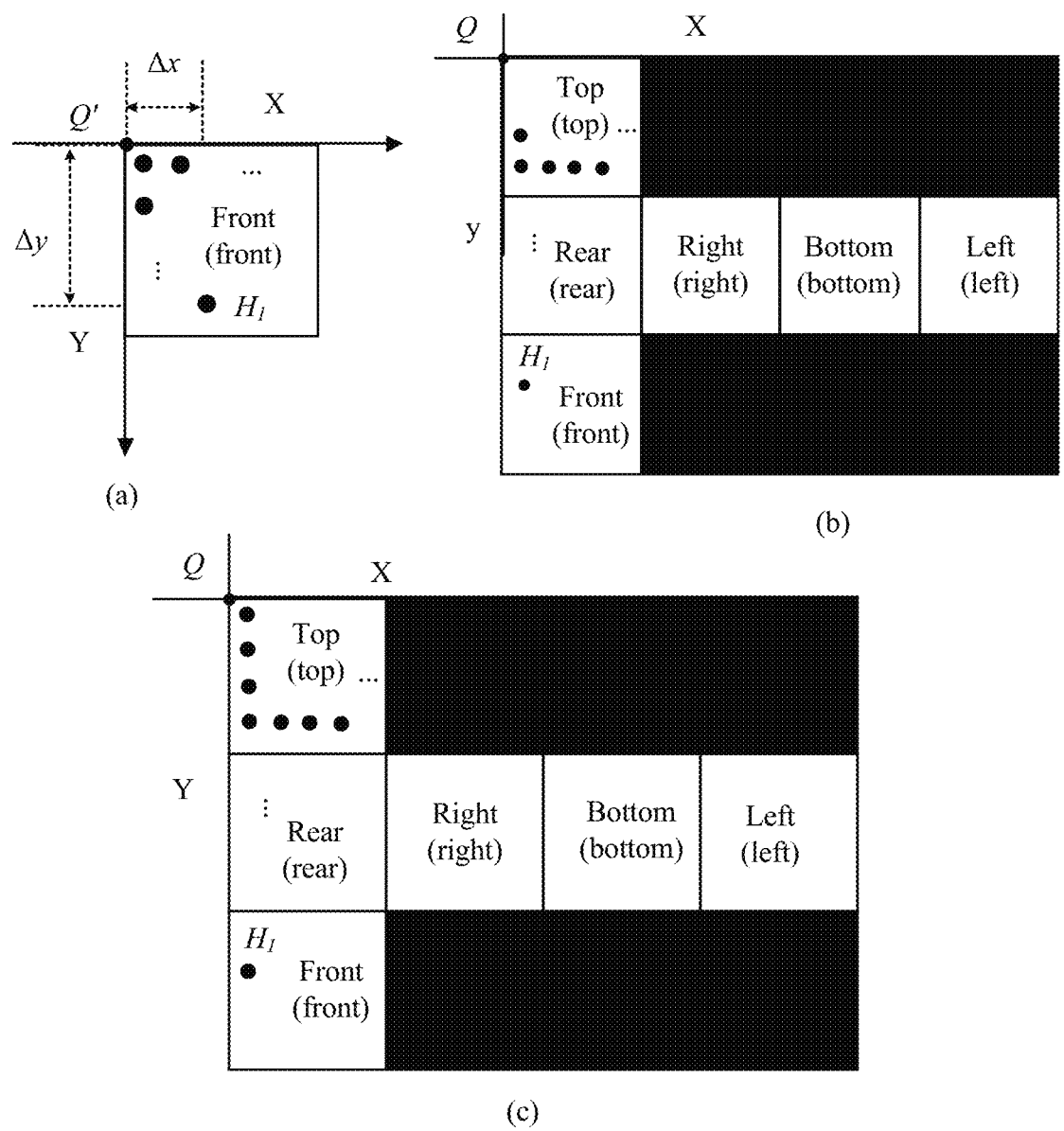
FIG. 17 is a schematic diagram of reference images in different layout formats.

With reference to FIG. 17, the following uses a two-dimensional image in a regular hexahedral format as an example to describe how to determine the location of the target reference pixel in the reference image. As shown in (a) in FIG. 17, it is assumed that an edge length of a regular hexahedron corresponding to the reference image is a, a layout format of the reference image is 4×3, the target reference pixel of the current pixel is projected to a point $H_1$ on a front face of the regular hexahedron, and distances of $H_1$ relative to a vertex in an upper left corner of the front face are respectively $\Delta x$ and $\Delta y$. The location of the target reference pixel in the reference image when two-dimensional images have different layout formats is determined below.

In (b) in FIG. 17, a width of an image is 4a, a height is 3a, a front face is located in a lower left corner, and no rotation is performed. In this case, a location of $H_1$ in the reference image relative to the vertex Q in the upper left corner of the reference image is $(\Delta x, a+\Delta y)$.

In (c) in FIG. 17, a front face is still located in a lower left corner and is at a same location as that in (b) in FIG. 17, but is rotated clockwise by 90 degrees. In this case, a location of $H_1$ in the reference image relative to the vertex Q in the upper left corner of the reference image is $(a-\Delta y, 2a+\Delta x)$.

Optionally, in an embodiment, the determining a prediction value of a pixel value of the current pixel based on a pixel value of the target reference pixel and/or a pixel value of a neighboring pixel of the target reference pixel includes determining the pixel value of the target reference pixel as the prediction value of the pixel value of the current pixel.

The pixel value of the target reference pixel may be a pixel value at the location of the target reference pixel, and the pixel value of the target reference pixel is directly determined as the prediction value of the current pixel such that a calculation procedure can be simplified.

Optionally, in an embodiment, the determining a prediction value of a pixel value of the current pixel based on a pixel value of the target reference pixel and/or a pixel value of a neighboring pixel of the target reference pixel includes performing weighted processing on the pixel value of the target reference pixel and the pixel value of the neighboring pixel of the target reference pixel; and determining, as the prediction value of the pixel value of the current pixel, a pixel value that is at the location of the target reference pixel and that is obtained through weighted processing.

The foregoing weighted processing may be performing smooth filtering processing on the target reference pixel and a pixel around the target reference pixel, that is, performing averaging processing on pixel values of a plurality of pixels including the target reference pixel, and using an obtained average value of the pixel values as the prediction value of the pixel value of the current pixel.

When the pixel value of the current pixel is predicted, the pixel value of the target reference pixel may be directly used as the prediction value of the pixel value of the current pixel, or the pixel value of the target reference pixel is not individually used to predict the pixel value of the current pixel, but the pixel value of the current pixel is predicted based on both the target reference pixel and the neighboring pixel around the target reference pixel.

Optionally, in an embodiment, the determining a prediction value of a pixel value of the current pixel based on a pixel value of the target reference pixel and/or a pixel value of a neighboring pixel of the target reference pixel includes performing an interpolation operation at the location of the target reference pixel based on the pixel value of the neighboring pixel of the target reference pixel; and determining, as the prediction value of the pixel value of the current pixel, a pixel value obtained through the interpolation operation.

After the pixel value of the target reference pixel is determined, precision of the pixel value of the target reference pixel may be determined first. When the precision of the pixel value of the target reference pixel is less than motion vector precision of the current pixel, an interpolation algorithm needs to be used to calculate a pixel value of a pixel around the target reference pixel, and the pixel value obtained through calculation is used as the pixel value of the target reference pixel. When the precision of the pixel value of the target reference pixel is ½ pixel precision, and the motion vector precision of the current pixel is ¼ pixel precision, the precision of the pixel value of the target reference pixel is less than the motion vector precision of the current pixel. Therefore, the interpolation algorithm needs to be used to recalculate the pixel value of the target reference pixel.

Figure 18:
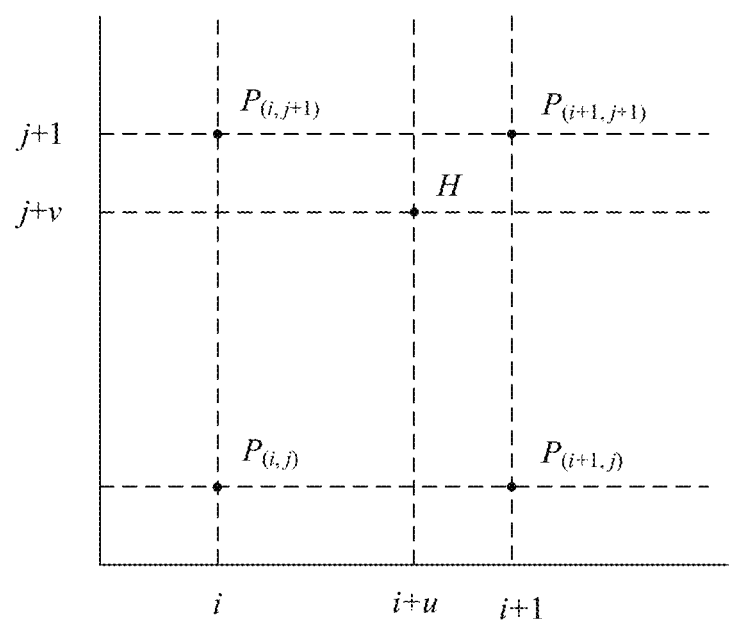
FIG. 18 is a schematic diagram of a neighboring pixel around a target reference pixel.

In an embodiment, as shown in FIG. 18, coordinates of a projection point H are (i+u, j+v), where both i and j are nonnegative integers and both u and v are floating point numbers in an interval [0,1), and location coordinates of four neighboring integer pixels around H are respectively $P_{(i,j)}$, $P_{(i,j+1)}$, $P_{(i,j+1)}$, and $P_{(i+1,j+1)}$.

If a bilinear interpolation algorithm is used, a pixel value at H may be obtained as follows:

$$P_H = P_{(i,j)}(1-u)(1-v) + P_{(i,j+1)}(u)(1-v) + P_{(i,j+1)}(1-u)(v) + P_{(i+1,j+1)}(u)(v) \quad (19).$$

If a bicubic interpolation algorithm is used, the coordinates of the projection point H are still (i+u, j+v), and coordinates of 16 neighboring points around the point H are respectively $P_{(i-1,j-1)}$, $P_{(i-1,j+0)}$, $P_{(i-1,j+1)}$, $P_{(i-1,j+2)}$, $P_{(i+0,j-1)}$, $P_{(i+0,j+0)}$, $P_{(i+0,j+1)}$, $P_{(i+0,j-2)}$, $P_{(i+1,j-1)}$, $P_{(i+1,j+0)}$, $P_{(i+1,j+1)}$, $P_{(i+1,j+2)}$, $P_{(i+2,j-1)}$, $P_{(i+2,j+0)}$, $P_{(i+2,j+1)}$, and $P_{(i+2,j+2)}$.

The bicubic interpolation algorithm is used to obtain the pixel value at H:

$$P_H = [A] * [B] * [C] \quad (45)$$

$$[A] = [S(u+1) \; S(u+0) \; S(u-1) \; S(u-2)] \quad (46)$$

$$[B] = \begin{bmatrix} P_{(i-1,j-1)} & P_{(i-1,j+0)} & P_{(i-1,j+1)} & P_{(i-1,j+2)} \\ P_{(i+0,j-1)} & P_{(i+0,j+0)} & P_{(i+0,j+1)} & P_{(i+0,j+2)} \\ P_{(i+1,j+1)} & P_{(i+1,j+0)} & P_{(i+1,j+1)} & P_{(i+1,j+2)} \\ P_{(i+2,j+1)} & P_{(i+2,j+0)} & P_{(i+2,j+1)} & P_{(i+2,j+2)} \end{bmatrix} \quad (47)$$

$$[C] = \begin{bmatrix} S(v+1) \\ S(v+0) \\ S(v-1) \\ S(v-2) \end{bmatrix} \quad (48)$$

$$S(x) = \begin{cases} 1 - 2|x|^2 + |x|^3, & |x| \le 1 \\ 4 - 8|x| + 5|x|^2 - |x|^3, & 1 < |x| < 2 \\ 0, & |x| > 2 \end{cases} \quad (49)$$

The foregoing uses only the bilinear interpolation algorithm and the bicubic interpolation algorithm as examples to describe in detail how to determine a pixel value at a location of a projection pixel by using the interpolation algorithm in this embodiment of this application. A Lanczos interpolation algorithm, a nearest neighbor interpolation algorithm, some non-analytic interpolation methods based on information such as an image structure, and the like may further be used.

It should be understood that, after the pixel value of the target reference pixel is determined, whether the pixel value of the target reference pixel meets a corresponding requirement may not be considered, but the pixel value of the target reference pixel is directly determined as the pixel value of the current pixel. In addition, after the pixel value of the target reference pixel is determined, whether the pixel value of the target reference pixel meets a preset requirement may be determined. When the pixel value of the target reference pixel does not meet the requirement, an interpolation operation may be performed on the target reference pixel based on the pixel value of the neighboring pixel of the target reference pixel, and an obtained pixel value is used as the prediction value of the pixel value of the current pixel; or weighted processing may be performed on the pixel value of the target reference pixel and the pixel value of the neighboring pixel of the target reference pixel, and a result obtained through weighted processing is used as the prediction value of the pixel value of the current pixel.

Figure 19:
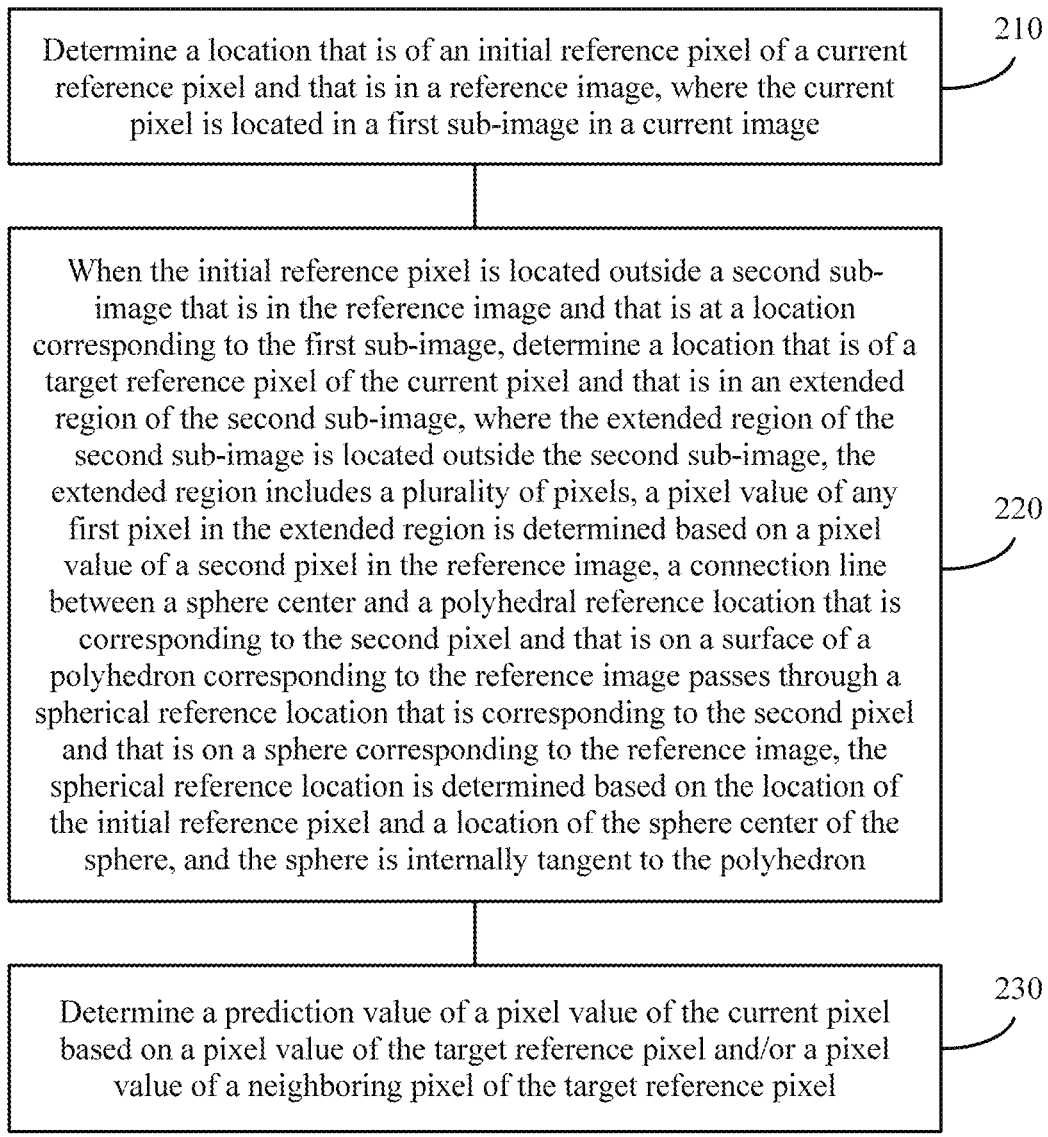
FIG. 19 is a schematic flowchart of a motion-compensated prediction method according to an embodiment of this application.

FIG. 19 is a schematic flowchart of a motion-compensated prediction method according to an embodiment of this application. The method shown in FIG. 19 includes the following steps.

210. Determine a location that is of an initial reference pixel of a current pixel and that is in a reference image, where the current pixel is located in a first sub-image in a current image.

220. When the initial reference pixel is located outside a second sub-image that is in the reference image and that is at a location corresponding to the first sub-image, determine a location that is of a target reference pixel of the current pixel and that is in an extended region of the second sub-image, where the extended region of the second sub-image is located outside the second sub-image, the extended region includes a plurality of pixels, a pixel value of a first pixel in the extended region is determined based on a pixel value of a second pixel in the reference image, a connection line between a sphere center and a polyhedral reference location that is corresponding to the second pixel and that is on a surface of a polyhedron corresponding to the reference image passes through a spherical reference location that is corresponding to the second pixel and that is on a sphere corresponding to the reference image, the spherical reference location is determined based on the location of the initial reference pixel and a location of the sphere center of the sphere, and the sphere is internally tangent to the polyhedron.

230. Determine a prediction value of a pixel value of the current pixel based on a pixel value of the target reference pixel and/or a pixel value of a neighboring pixel of the target reference pixel.

In this embodiment of this application, when the initial reference pixel is located outside the second sub-image, the target reference pixel that can really play a reference role is found in the extended region directly based on the current pixel and motion information of the current pixel, and then the pixel value of the current pixel is predicted based on the target reference pixel such that the target reference pixel can be quickly found, and accuracy of motion-estimation prediction can be improved.

In the some approaches, an extended region is not constructed for each sub-image in the reference image. Instead, the prediction value of the pixel value of the current pixel is calculated directly based on a pixel value of the initial reference pixel, without considering the location of the initial reference pixel in the reference image. In this embodiment of this application, an extended region may be constructed for a sub-image in the reference image based on the method shown in FIG. 5. In this way, when the location of the initial reference pixel is not in a sub-image region that is in the reference image and that is corresponding to the current pixel, a location of a reference pixel in the extended region is determined based on the motion information, and a pixel value of the reference pixel in the extended region is used as the prediction value of the pixel value of the current pixel.

It should be understood that the pixel value of the pixel in the extended region may be calculated based on the method shown in FIG. 5. In this way, when the pixel value of the current pixel is predicted, the target reference pixel can be directly found in the extended region, and the pixel value of the current pixel can be quickly predicted.

Optionally, in an embodiment, the method shown in FIG. 19 further includes determining, based on a location of the first pixel and the location of the sphere center of the sphere corresponding to the reference image, the spherical reference location that is corresponding to the second pixel and that is on a surface of the sphere; determining, based on the spherical reference location, the polyhedral reference location that is corresponding to the second pixel and that is on the surface of the polyhedron corresponding to the reference image; and determining a location of the second pixel in the reference image based on the polyhedral reference location.

Optionally, in an embodiment, the determining, based on a location of the first pixel and the location of the sphere center of the sphere corresponding to the reference image, the spherical reference location that is corresponding to the second pixel and that is on a surface of the sphere includes determining, based on the location of the first pixel and an offset value of the location of the first pixel relative to the second sub-image, a first location that is of the first pixel and that is on a plane on which a first face of the polyhedron is located, where the first face is a face that is corresponding to the second sub-image and that is of the polyhedron; and determining, based on the first location and the location of the sphere center of the sphere, the spherical reference location that is corresponding to the second pixel and that is on the surface of the sphere, where a connection line between the first location and the location of the sphere center passes through the spherical reference location.

To be specific, a pixel value of any pixel in the extended region may be determined by using the method shown in FIG. 5. The spherical reference location that is corresponding to the second pixel and that is on the sphere is determined based on the location of the first pixel. Then, the polyhedral reference location that is corresponding to the second pixel and that is on the polyhedron is determined based on the spherical reference location. Subsequently, the location of the second pixel in the reference image is determined based on the polyhedral reference location. Finally, the pixel value of the first pixel is determined based on the location of the second pixel in the reference image. A pixel value of each pixel in the extended region is determined by using the same method. In this way, during motion-compensated prediction, the location of the target reference pixel in the extended region can be directly determined, thereby improving efficiency of motion-compensated prediction.

Optionally, in an embodiment, the method shown in FIG. 19 further includes determining, based on layout information of the reference image and the location of the initial reference pixel, whether the initial reference pixel is located outside the second sub-image in the reference image.

It should be understood that, whether the location of the initial reference pixel is outside the second sub-image may be determined after the location of the initial reference pixel in the reference image is determined and before the spherical reference location is determined based on the location of the initial reference pixel and the location of the sphere center of the sphere corresponding to the reference image.

Optionally, in an embodiment, the initial reference pixel is located in the second sub-image in the reference image, and the prediction value of the pixel value of the current pixel is determined based on the pixel value of the initial reference pixel and/or the pixel value of the neighboring pixel of the target reference pixel. To be specific, when the initial reference pixel is located in the second sub-image in the reference image, the pixel value of the current pixel may be predicted directly based on the first initial reference pixel.

Figure 20A:
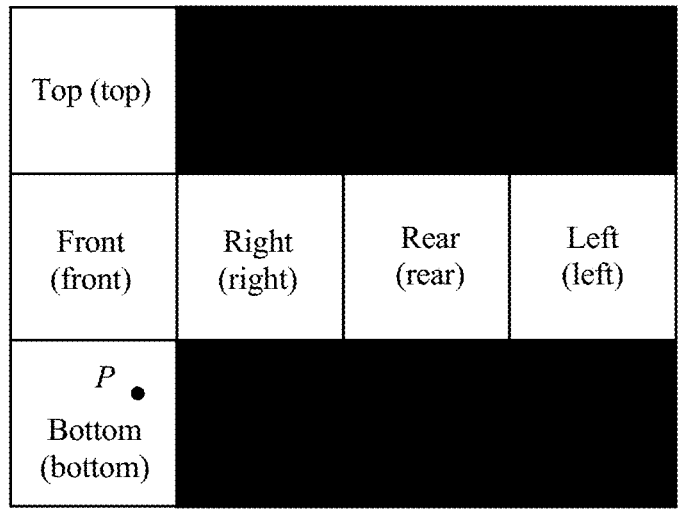
FIG. 20A and FIG. 20B are a schematic diagram of a current image, a reference image, and an extended region of the reference image.
Figure 20A:
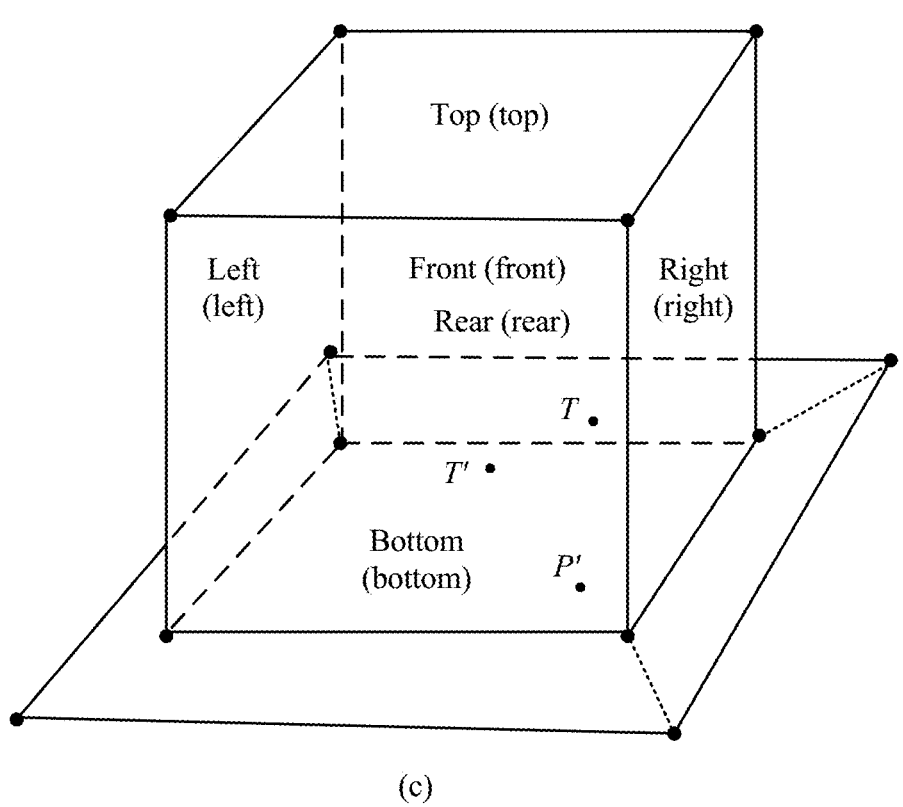
Figure 20B:
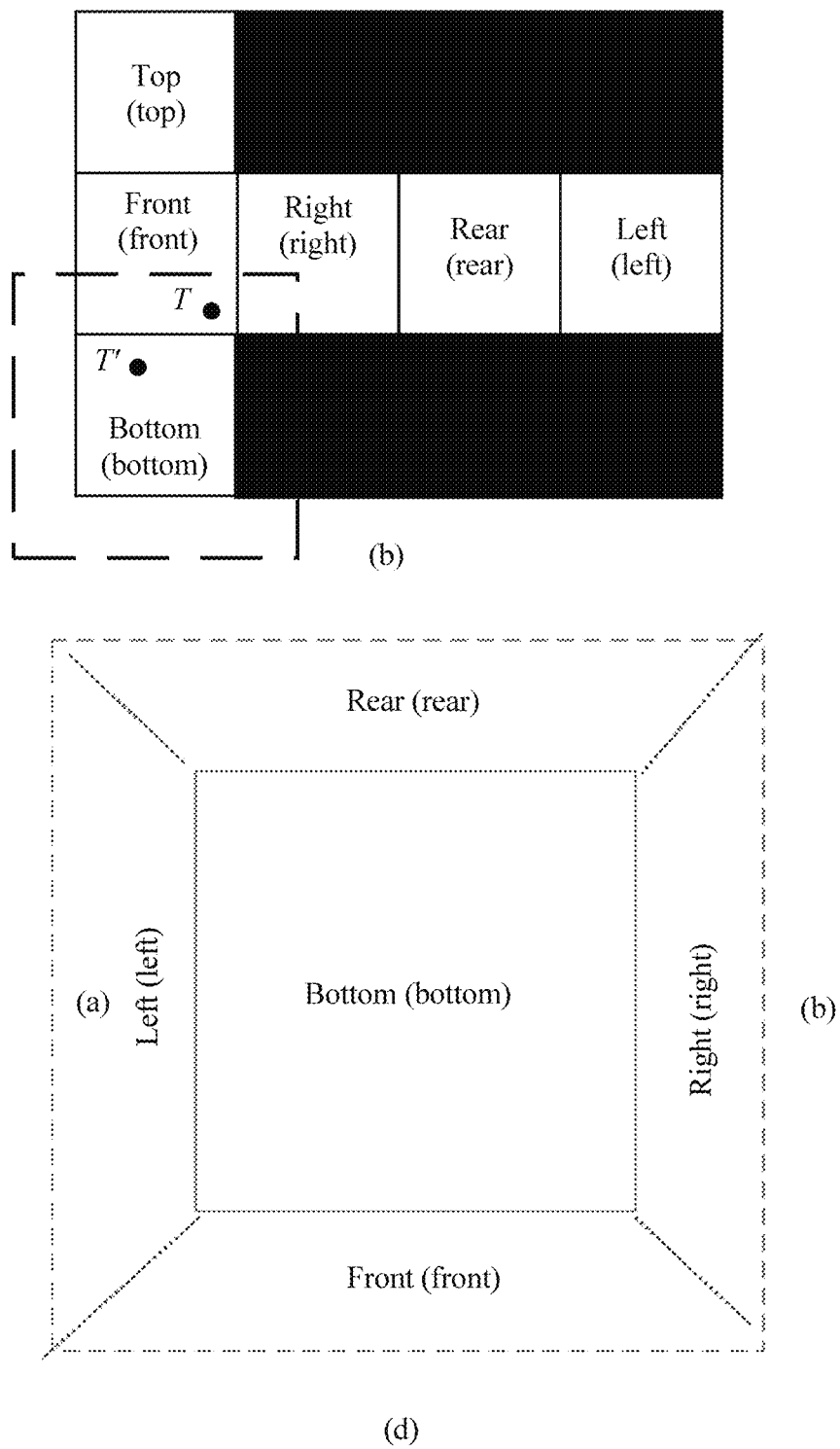

In an embodiment, in a motion-compensated prediction method shown in FIG. 20A and FIG. 20B, an extended region of a sub-image in a reference image is first determined (or extended regions of a plurality of sub-images in the reference image may be determined), and then a location of a reference pixel in the extended region is determined. In this way, when prediction is performed for a current pixel, the reference pixel can be directly found in the extended region, and prediction can be performed for the current pixel based on a pixel value of the reference pixel. The following describes the foregoing process in detail with reference to FIG. 20A and FIG. 20B. Specific steps are as follows.

201. Construct an extended region for a face that is in a reference image and that is at a face on which the current pixel is located.

The face on which the current pixel is located is determined based on layout information of a polyhedron corresponding to the reference image (generally, the layout information of the polyhedron corresponding to the reference image is the same as layout information of a current image, and therefore the layout information of the polyhedron can be used to determine a face on which a pixel in the current image is located) and a location of the current pixel, to find the face that is in the reference image and that is corresponding to the current pixel; an extended region is constructed for the corresponding face; and a pixel value of a pixel in the extended region is determined. The extended region is obtained by extending or filling the face around the face. As shown in (a) in FIG. 20A, the current pixel P is located on a bottom face, and then an extended region needs to be constructed for a bottom face in the reference image. A range of the extended region is shown by a dashed-line region outside the bottom face in (b) in FIG. 20B. When a pixel value of a pixel in the extended region is calculated, a polyhedron that is corresponding to the reference image and is shown in (c) in FIG. 20A may be constructed by using the bottom face in the reference image as the bottom. If the polyhedron is spread, locations that are in the extended region and are respectively of a rear face, a front face, a left face, a right face, and the like of the polyhedron are shown in (d) in FIG. 20B. For a first pixel in the extended region, the motion-compensated prediction method in the embodiment of this application shown in FIG. 5 may be used. First, a spherical reference location is determined based on a location of the first pixel and a location of a sphere center of a sphere corresponding to the reference image; then, a polyhedral reference location is determined; and finally, a location of a second pixel in the reference image is determined, and a pixel value of the first pixel is determined based on the second pixel (a pixel value of the second pixel may be directly determined as the pixel value of the first pixel, or a specific operation may be performed on the second pixel or a pixel around the second pixel, and a pixel value obtained through the operation is used as the pixel value of the first pixel). Herein, the first pixel is similar to the initial reference pixel in the motion-compensated prediction method in the embodiment of this application shown in FIG. 5, and the second pixel is similar to the target reference pixel in the motion-compensated prediction method in the embodiment of this application shown in FIG. 5.

202. Determine a location that is of a target reference pixel of the current pixel and that is in the extended region.

First, a reference pixel of the current pixel is determined, and whether the reference pixel is located on a face corresponding to the face on which the current pixel is located is determined based on the face on which the current pixel is located and a location of the reference pixel. If the reference pixel is located on a face that is at a same location as the current pixel, a pixel value at the location of the reference pixel may be directly used as a prediction value of a pixel value of the current pixel. Otherwise, the following operation needs to be performed. A corresponding location of the reference pixel in the extended region is first determined based on a location offset of the reference pixel relative to the current pixel. As shown in (b) in FIG. 20B, a reference pixel T is not located on a face that is at a same location as the current pixel P. In this case, based on the location offset of the reference pixel relative to the current pixel, it can be learned that the reference pixel T should be located in a region that is corresponding to the rear face and that is in the extended region. If the extended region is placed based on a relative spatial location, as shown in (d) in FIG. 20B, the location of the reference pixel in the extended region is determined based on the relative location offset. Otherwise, the location of the reference pixel in the extended region needs to be determined based on a specific method for placing the extended region.

203. Determine a prediction value of a pixel value of the current pixel.

After the corresponding location of the reference pixel in the extended region is determined, the pixel value at the location is used as the prediction value of the pixel value of the current pixel.

It should be understood that a pixel in the foregoing extended region may be an integer pixel, or may be a fractional pixel. If the pixel is a fractional pixel, a specific pixel value may be ½ precision, ¼ precision, ⅛ precision, or the like.

In addition, after the location of the reference pixel in the extended region is determined, if there is no pixel value at the location, an interpolation operation needs to be performed on the reference pixel. For a specific interpolation operation method, a DCT interpolation method, a bilinear interpolation method, or another interpolation method may be used.

It should be understood that, a difference between the method shown in FIG. 19 and the method shown in FIG. 5 is as follows. In FIG. 19, a pixel value of a pixel in the extended region is calculated in advance such that when prediction is performed for the current pixel, it can be more convenient to directly find the target reference pixel in the extended region, and a calculation process of determining the location of the target reference pixel based on the location of the initial reference pixel is omitted. In the method shown in FIG. 5, when the pixel value of the current pixel is predicted, the location of the target reference pixel is determined based on the location of the initial reference pixel, and therefore an additional calculation process exists compared with the method shown in FIG. 19. In addition, other steps of the method shown in FIG. 19 are basically the same as other steps of the method shown in FIG. 5. For brevity, repeated descriptions are appropriately omitted.

Figure 21:
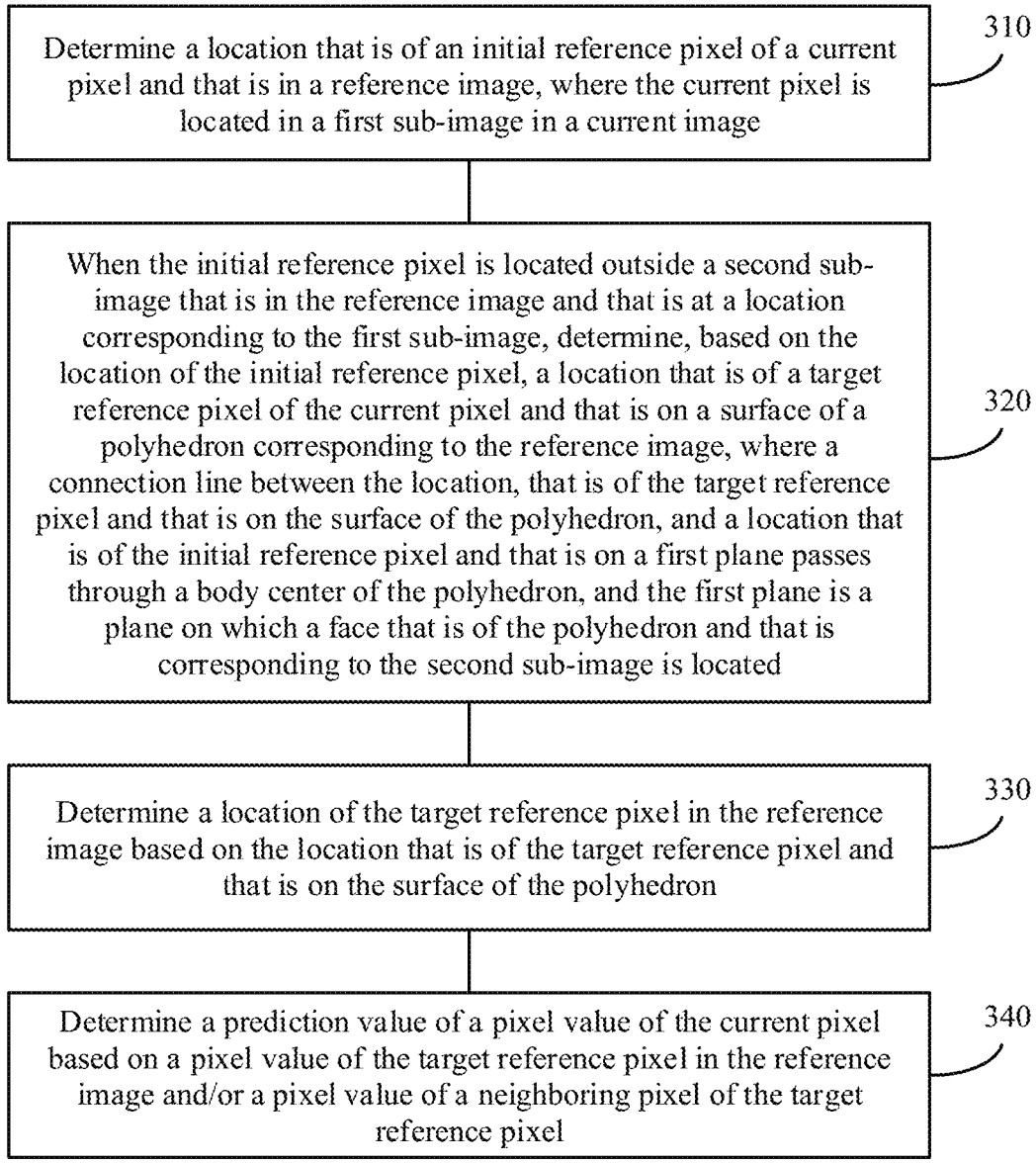
FIG. 21 is a schematic flowchart of a motion-compensated prediction method according to an embodiment of this application.

FIG. 21 is a schematic flowchart of a motion-compensated prediction method according to an embodiment of this application. The method shown in FIG. 21 includes the following steps.

310. Determine a location that is of an initial reference pixel of a current pixel and that is in a reference image, where the current pixel is located in a first sub-image in a current image.

320. When the initial reference pixel is located outside a second sub-image that is in the reference image and that is at a location corresponding to the first sub-image, determine, based on the location of the initial reference pixel, a location that is of a target reference pixel of the current pixel and that is on a surface of a polyhedron corresponding to the reference image, where a connection line between the location, that is of the target reference pixel and that is on the surface of the polyhedron, and a location that is of the initial reference pixel and that is on a first plane passes through a body center of the polyhedron, and the first plane is a plane on which a face that is of the polyhedron and that is corresponding to the second sub-image is located.

330. Determine a location of the target reference pixel in the reference image based on the location that is of the target reference pixel and that is on the surface of the polyhedron.

340. Determine a prediction value of a pixel value of the current pixel based on a pixel value of the target reference pixel in the reference image and/or a pixel value of a neighboring pixel of the target reference pixel.

In this embodiment of this application, when the initial reference pixel is located outside the second sub-image, the target reference pixel that can really play a reference role is found based on the location of the initial reference pixel, and then the pixel value of the current pixel is predicted based on the target reference pixel, thereby improving accuracy of motion-compensated prediction.

It should be understood that, in this embodiment of this application, a difference between the motion-compensated prediction method shown in FIG. 5 and the motion-compensated prediction method shown in FIG. 21 is as follows. In FIG. 5, the spherical reference location is determined based on the location of the initial reference pixel and the location of the sphere center of the sphere; then, the polyhedral reference location is determined based on the spherical reference location; finally, the location of the target reference pixel in the reference image is determined based on the polyhedral reference location. In FIG. 21, the location that is of the target reference pixel and that is on the surface of the polyhedron corresponding to the reference image is first determined based on the location of the initial reference pixel, and then the location of the target reference pixel in the reference image is determined based on the location that is of the target reference pixel and that is on the surface of the polyhedron. Through comparison of the two methods, the method shown in FIG. 5 is to determine the location of the target reference pixel in the reference image by performing three steps, and the method shown in FIG. 21 is to determine the location of the target reference pixel in the reference image by performing two steps. It should be understood that related explanations and descriptions of the motion-compensated prediction method shown in FIG. 5 are also applicable to the motion-compensated prediction method shown in FIG. 16. Therefore, for brevity, repeated descriptions are appropriately omitted herein.

Optionally, in an embodiment, the determining, based on the location of the initial reference pixel, a location that is of a target reference pixel of the current pixel and that is on a surface of a polyhedron corresponding to the reference image includes determining, based on the location of the initial reference pixel and layout information of the reference image, the location that is of the initial reference pixel and that is on the first plane; and determining, based on the layout information of the reference image and the location that is of the initial reference pixel and that is on the first plane, the location that is of the target reference pixel and that is on the surface of the polyhedron.

Optionally, in an embodiment, the determining a location of the target reference pixel in the reference image based on the location that is of the target reference pixel and that is on the surface of the polyhedron includes determining the location of the target reference pixel in the reference image based on the location of the initial reference pixel and the layout information of the reference image, where the location that is of the target reference pixel and that is on the surface of the polyhedron is at a point at which the surface of the polyhedron is intersected with a connection line between the initial reference pixel and the body center of the polyhedron.

It should be understood that the motion-compensated prediction method in this embodiment of this application is applicable to two-dimensional images in various polyhedral formats. In addition, the motion-compensated prediction method in this embodiment of this application is also applicable to a case in which a face in the two-dimensional image in the polyhedral format is rotated, a face arrangement order is changed, and a spatial layout format of faces is changed.

It should be understood that, in this embodiment of this application, the pixel value at the location of the target reference pixel may be calculated when the pixel value of the current pixel is predicted. Alternatively, the pixel value of the target reference pixel of the to-be-processed pixel may be calculated in advance. In this way, when the to-be-processed pixel is processed, the pixel value of the target reference pixel of the to-be-processed pixel can be directly obtained, thereby saving image processing time.

It should be understood that, although a two-dimensional image in a hexahedral format is used as an example in the foregoing descriptions, the method is also applicable to two-dimensional images in other polyhedral formats, including a tetrahedral format, an octahedral format, and another polyhedral format.

It should be understood that, the foregoing describes in detail the motion-compensated prediction method in this embodiment of this application by using a two-dimensional image in a 4×3 format. The motion-compensated prediction method in this embodiment of this application is also applicable to two-dimensional images in other polyhedral formats. The motion-compensated prediction method in this embodiment of this application is also applicable to a case in which faces in the two-dimensional image are partially or all rotated, different face arrangement orders, different face arrangement methods, and the like.

It should be understood that, in this embodiment, a pixel value of a reference pixel in the reference image may be directly used as the prediction value of the pixel value of the current pixel; or a weighted value of a pixel value of a reference pixel and a pixel value of a pixel around the reference pixel or a pixel value obtained by performing another operation on the pixel value of the reference pixel and the pixel value of the pixel around the reference pixel may be used as the prediction value of the pixel value of the current pixel.

Figure 22:
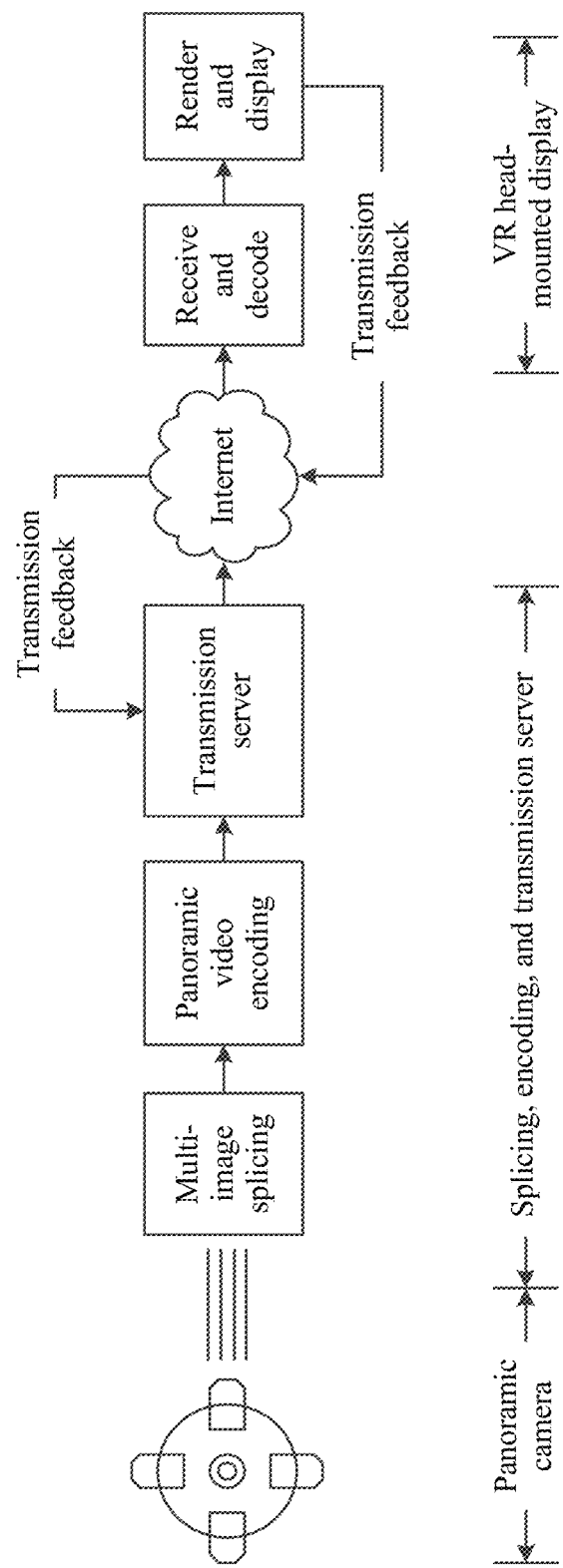
FIG. 22 is a schematic diagram of an architecture to which a motion-compensated prediction method is applied according to an embodiment of this application.

The motion-compensated prediction method in this embodiment of this application may be applied to an architecture shown in FIG. 22, and may be applied to a process of encoding and decoding a two-dimensional panoramic image. In FIG. 22, an existing VR video image collection device is usually a circular or spherical multi-camera array. Each camera may collect images at different angles to obtain a multi-angle-of-view video image of a current scene. Next, a VR video processing device performs image splicing on the multi-angle-of-view image to obtain a three-dimensional spherical panorama, and then maps the three-dimensional spherical panorama to obtain a two-dimensional panorama image, to facilitate input of subsequent operations such as processing, compression, transmission, and storage. The VR video processing device stores, in a transmission server, a result obtained through processing. A VR head-mounted display device may obtain, through a network or the like, the image processing result stored in the transmission server, and may display the three-dimensional spherical panoramic image after performing a corresponding operation such as decoding.

The foregoing describes in detail the motion-compensated prediction methods in the embodiments of this application with reference to FIG. 1 to FIG. 22. The following describes in detail motion-compensated prediction apparatuses in the embodiments of this application with reference to FIG. 23 to FIG. 28. It should be understood that the motion-compensated prediction apparatuses in FIG. 23 to FIG. 28 can perform the steps of the motion-compensated prediction methods in FIG. 1 to FIG. 22. To avoid repetition, repeated descriptions are appropriately omitted.

Figure 23:
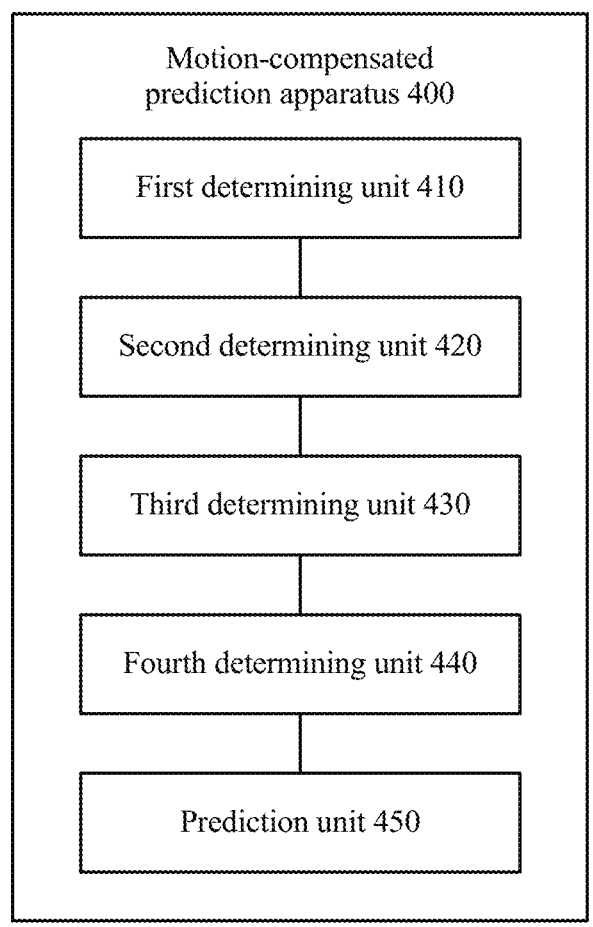
FIG. 23 is a schematic block diagram of a motion-compensated prediction apparatus according to an embodiment of this application.

FIG. 23 is a schematic block diagram of a motion-compensated prediction apparatus 400 according to an embodiment of this application. The motion-compensated prediction apparatus 400 includes a first determining unit 410 configured to determine a location that is of an initial reference pixel of a current pixel and that is in a reference image, where the current pixel is located in a first sub-image in the current image; a second determining unit 420 configured to when the initial reference pixel is located outside a second sub-image that is in the reference image and that is at a location corresponding to the first sub-image, determine, based on the location of the initial reference pixel and a location of a sphere center of a sphere corresponding to the reference image, a spherical reference location that is corresponding to a target reference pixel of the current pixel and that is on a surface of the sphere; a third determining unit 430 configured to determine, based on the spherical reference location, a polyhedral reference location that is corresponding to the target reference pixel and that is on a surface of a polyhedron corresponding to the reference image, where the sphere is internally tangent to the polyhedron, and a connection line between the polyhedral reference location and the sphere center passes through the spherical reference location; a fourth determining unit 440 configured to determine a location of the target reference pixel in the reference image based on the polyhedral reference location; and a prediction unit 450 configured to determine a prediction value of a pixel value of the current pixel based on a pixel value of the target reference pixel and/or a pixel value of a neighboring pixel of the target reference pixel.

In this embodiment of this application, when the initial reference pixel is located outside the second sub-image, due to geometric deformation on a boundary of a sub-mage in a two-dimensional image, it is inaccurate to perform prediction for the current pixel directly based on the initial reference pixel. Therefore, in this case, in this application, the target reference pixel that can really play a reference role is found based on the location of the initial reference pixel, and then the pixel value of the current pixel is predicted based on the target reference pixel, thereby improving accuracy of motion estimation prediction.

Optionally, in an embodiment, the second determining unit 420 is configured to determine, based on the location of the initial reference pixel and an offset value of the location of the initial reference pixel relative to the second sub-image, a first location that is of the initial reference pixel and that is on a plane on which a first face of the polyhedron is located, where the first face is a face that is corresponding to the second sub-image and that is of the polyhedron; and determine, based on the first location and the location of the sphere center of the sphere, the spherical reference location that is corresponding to the target reference pixel and that is on the surface of the sphere, where a connection line between the first location and the location of the sphere center passes through the spherical reference location.

Optionally, in an embodiment, the motion-compensated prediction apparatus 400 further includes a judging unit 460 configured to determine, based on layout information of the reference image and the location of the initial reference pixel, whether the initial reference pixel is located outside the second sub-image in the reference image.

Optionally, in an embodiment, the fourth determining unit 440 is configured to determine the location of the target reference pixel in the reference image based on the polyhedral reference location and layout information of the polyhedron.

Optionally, in an embodiment, the layout information includes at least one of face quantity information of the polyhedron, sub-image arrangement manner information of the reference image, sub-image arrangement order information of the reference image, and sub-image rotation information of the reference image.

Optionally, in an embodiment, the prediction unit 450 is configured to determine the pixel value of the target reference pixel as the prediction value of the pixel value of the current pixel.

Optionally, in an embodiment, the prediction unit 450 is configured to perform weighted processing on the pixel value of the target reference pixel and the pixel value of the neighboring pixel of the target reference pixel; and determine, as the prediction value of the pixel value of the current pixel, a pixel value that is at the location of the target reference pixel and that is obtained through weighted processing.

Optionally, in an embodiment, the prediction unit 450 is configured to perform an interpolation operation at the location of the target reference pixel based on the pixel value of the neighboring pixel of the target reference pixel; and determine, as the prediction value of the pixel value of the current pixel, a pixel value obtained through the interpolation operation.

Figure 24:
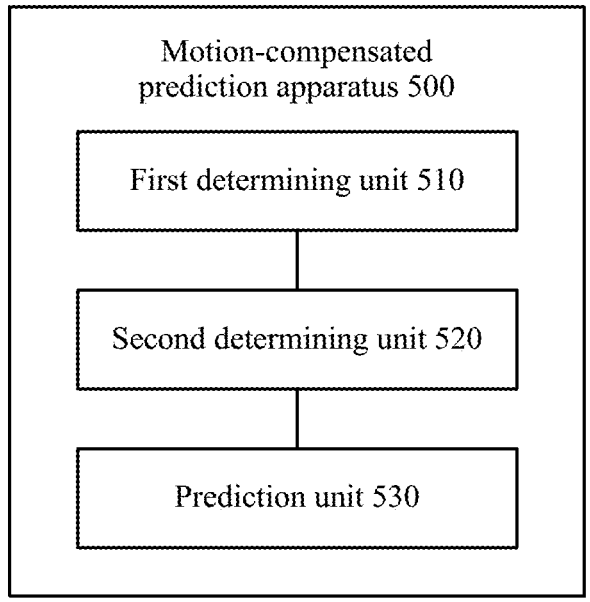
FIG. 24 is a schematic block diagram of a motion-compensated prediction apparatus according to an embodiment of this application.

FIG. 24 is a schematic block diagram of a motion-compensated prediction apparatus according to an embodiment of this application. The motion-compensated prediction apparatus 500 includes a first determining unit 510 configured to determine a location that is of an initial reference pixel of a current pixel and that is in a reference image, where the current pixel is located in a first sub-image in the current image; a second determining unit 520 configured to when the initial reference pixel is located outside a second sub-image that is in the reference image and that is at a location corresponding to the first sub-image, determine a location that is of a target reference pixel of the current pixel and that is in an extended region of the second sub-image, where the extended region of the second sub-image is located outside the second sub-image, the extended region includes a plurality of pixels, a pixel value of a first pixel in the extended region is determined based on a pixel value of a second pixel in the reference image, a connection line between a sphere center and a polyhedral reference location that is corresponding to the second pixel and that is on a surface of a polyhedron corresponding to the reference image passes through a spherical reference location that is corresponding to the second pixel and that is on a sphere corresponding to the reference image, the spherical reference location is determined based on the location of the initial reference pixel and a location of the sphere center of the sphere, and the sphere is internally tangent to the polyhedron; and a prediction unit 530 configured to determine a prediction value of a pixel value of the current pixel based on a pixel value of the target reference pixel and/or a pixel value of a neighboring pixel of the target reference pixel.

In this embodiment of this application, when the initial reference pixel is located outside the second sub-image, due to geometric deformation on a boundary of a sub-mage in a two-dimensional image, it is inaccurate to perform prediction for the current pixel directly based on the initial reference pixel. Therefore, in this case, in this application, the target reference pixel that can really play a reference role is found in the extended region directly based on the current pixel and motion information of the current pixel, and then the pixel value of the current pixel is predicted based on the target reference pixel such that the target reference pixel can be quickly found, and accuracy of motion estimation prediction can be improved.

Optionally, in an embodiment, the motion-compensated prediction apparatus further includes a third determining unit 540 configured to determine, based on a location of the first pixel and the location of the sphere center of the sphere corresponding to the reference image, the spherical reference location that is corresponding to the second pixel and that is on a surface of the sphere; a fourth determining unit 550 configured to determine, based on the spherical reference location, the polyhedral reference location that is corresponding to the second pixel and that is on the surface of the polyhedron corresponding to the reference image; and a fifth determining unit 560 configured to determine a location of the second pixel in the reference image based on the polyhedral reference location.

Optionally, in an embodiment, the third determining unit 540 is configured to determine, based on the location of the first pixel and an offset value of the location of the first pixel relative to the second sub-image, a first location that is of the first pixel and that is on a plane on which a first face of the polyhedron is located, where the first face is a face that is corresponding to the second sub-image and that is of the polyhedron; and determine, based on the first location and the location of the sphere center of the sphere, the spherical reference location that is corresponding to the second pixel and that is on the surface of the sphere, where a connection line between the first location and the location of the sphere center passes through the spherical reference location.

Optionally, in an embodiment, the motion-compensated prediction apparatus further includes a judging unit 570 configured to determine, based on layout information of the reference image and the location of the initial reference pixel, whether the initial reference pixel is located outside the second sub-image in the reference image.

Figure 25:
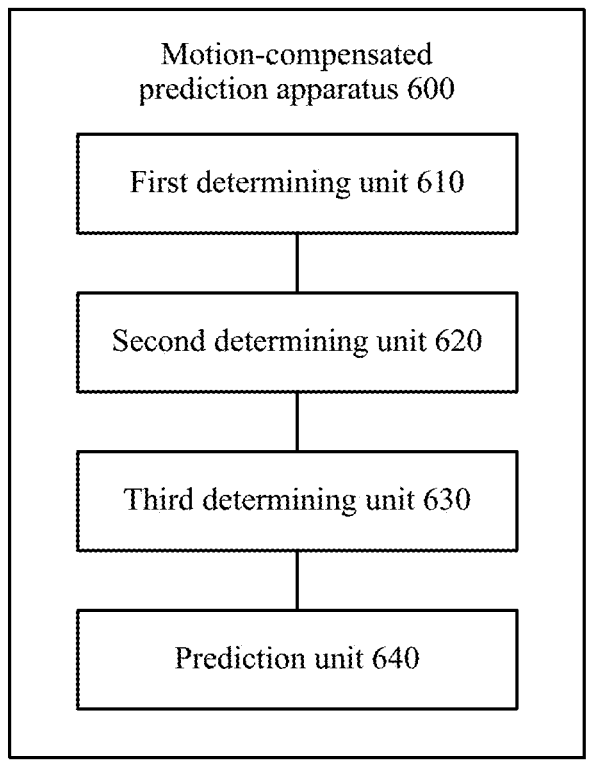
FIG. 25 is a schematic block diagram of a motion-compensated prediction apparatus according to an embodiment of this application.

FIG. 25 is a schematic block diagram of a motion-compensated prediction apparatus according to an embodiment of this application. The motion-compensated prediction apparatus 600 includes a first determining unit 610 configured to determine a location that is of an initial reference pixel of a current pixel and that is in a reference image, where the current pixel is located in a first sub-image in the current image; a second determining unit 620 configured to when the initial reference pixel is located outside a second sub-image that is in the reference image and that is at a location corresponding to the first sub-image, determine, based on the location of the initial reference pixel, a location that is of a target reference pixel of the current pixel and that is on a surface of a polyhedron corresponding to the reference image, where a connection line between the location, that is of the target reference pixel and that is on the surface of the polyhedron, and a location that is of the initial reference pixel and that is on a first plane passes through a body center of the polyhedron, and the first plane is a plane on which a face that is of the polyhedron and that is corresponding to the second sub-image is located; a third determining unit 630 configured to determine a location of the target reference pixel in the reference image based on the location that is of the target reference pixel and that is on the surface of the polyhedron; and a prediction unit 640 configured to determine a prediction value of a pixel value of the current pixel based on a pixel value of the target reference pixel in the reference image and/or a pixel value of a neighboring pixel of the target reference pixel.

In this embodiment of this application, when the initial reference pixel is located outside the second sub-image, due to geometric deformation on a boundary of a sub-mage in a two-dimensional image, it is inaccurate to perform prediction for the current pixel directly based on the initial reference pixel. Therefore, in this case, in this application, the target reference pixel that can really play a reference role is found based on the location of the initial reference pixel, and then the pixel value of the current pixel is predicted based on the target reference pixel, thereby improving accuracy of motion estimation prediction.

Optionally, in an embodiment, the second determining unit 620 is configured to determine, based on the location of the initial reference pixel and layout information of the reference image, the location that is of the initial reference pixel and that is on the first plane; and determine, based on the layout information of the reference image and the location that is of the initial reference pixel and that is on the first plane, the location that is of the target reference pixel and that is on the surface of the polyhedron.

Optionally, in an embodiment, the third determining unit is configured to determine the location of the target reference pixel in the reference image based on the location of the initial reference pixel and the layout information of the reference image, where the location that is of the target reference pixel and that is on the surface of the polyhedron is at a point at which the surface of the polyhedron is intersected with a connection line between the initial reference pixel and the body center of the polyhedron.

The foregoing describes in detail the motion-compensated prediction method and the motion-compensated prediction apparatus in the embodiments of this application with reference to FIG. 1 to FIG. 25. The motion-compensated prediction method in the embodiments of this application may be considered as an intermediate process or step in an encoding or decoding process, and a panoramic video encoder or a panoramic video decoder may implement the motion-compensated prediction method in the embodiments of this application. The following separately describes in detail a decoding process of the panoramic video decoder and an encoding process of the panoramic video encoder with reference to FIG. 26 and FIG. 27.

Before the decoding process of the panoramic video decoder and the encoding process of the panoramic video encoder are described with reference to FIG. 26 and FIG. 27, encoding and decoding are first briefly described.

Before a current image is encoded, the current image is usually divided into several equal-sized blocks, and then an encoding operation is performed on each block. In a process of encoding the current image, layout information of the current image is usually transmitted to a decoder side as header information. The header information is pilot information such that after receiving an encoded bitstream, the decoder first decodes the header information, and then decodes a subsequent bitstream based on the header information. It is assumed that during encoding, the current image is divided into a plurality of image blocks for sequential encoding, and decoding is sequentially performed in a same order. For a current block, if an inter coding manner is used for the current block, to obtain reconstructed information of the current block, a reconstructed value of a pixel value of a pixel in the current block needs to be obtained.

For encoding, the process mainly includes steps such as intra prediction, inter prediction, transform, quantization, and entropy encoding. When an image is encoded, intra prediction and inter prediction may be performed after the image is divided into image blocks; then transform and quantization are performed after a residual is obtained; and finally, entropy encoding is performed and a bitstream is output. The image block herein is an M×N array including pixels (where both M and N are integers greater than 0, and M may be equal to N, or may not be equal to N), and a pixel value at a location of each pixel is known.

Intra prediction is to predict a pixel value of a pixel in a current block by using a pixel value of a pixel in a reconstructed region in a current image. Inter prediction is to search a reconstructed image for a matching reference block for a current coding block in a current image; use a pixel value of a pixel in the reference block as prediction information or a prediction value (the following no longer distinguishes information and a value) of a pixel value of a pixel in the current coding block (this process is referred to as motion estimation (ME)); and transmit, to the decoder side, motion vector (MV) information (namely, a location offset of a location of the reference block relative to a location of the current block) of the current block pointing to the reference block, indication information of an image in which the reference block is located, and the like. In the motion estimation process, a plurality of reference blocks in a reference image need to be selected for the current block, and a reference block or reference blocks that is/are finally used to perform prediction for the current block may be determined by using a rate-distortion optimization (RDO) method or another method.

After the prediction information is obtained through intra prediction or inter prediction, residual information may be obtained by subtracting the corresponding prediction information (namely, the pixel value of the corresponding pixel in the corresponding reference block) from the pixel value of the pixel in the current coding block. After the residual information is obtained, the residual information is transformed by using a method such as discrete cosine transform (DCT), and a bitstream is finally obtained through quantization and entropy encoding.

Decoding is equivalent to an inverse process of encoding. During decoding, first, residual information is obtained through entropy decoding, dequantization, and inverse transform, and whether intra prediction or inter prediction is used for a current block is determined based on a decoded bitstream. If intra coding is used, prediction information is constructed by using the used intra prediction method and a pixel value of a pixel that is in a reconstructed region and that is around a current to-be-processed pixel. If inter coding is used, motion information needs to be parsed out; a reference block is determined from a reconstructed image based on the motion information obtained through parsing, and a pixel value of a pixel in the block is used as prediction information (this process is also referred to as motion compensation); and finally, reconstructed information may be obtained by adding the prediction information and the residual information.

Figure 26:
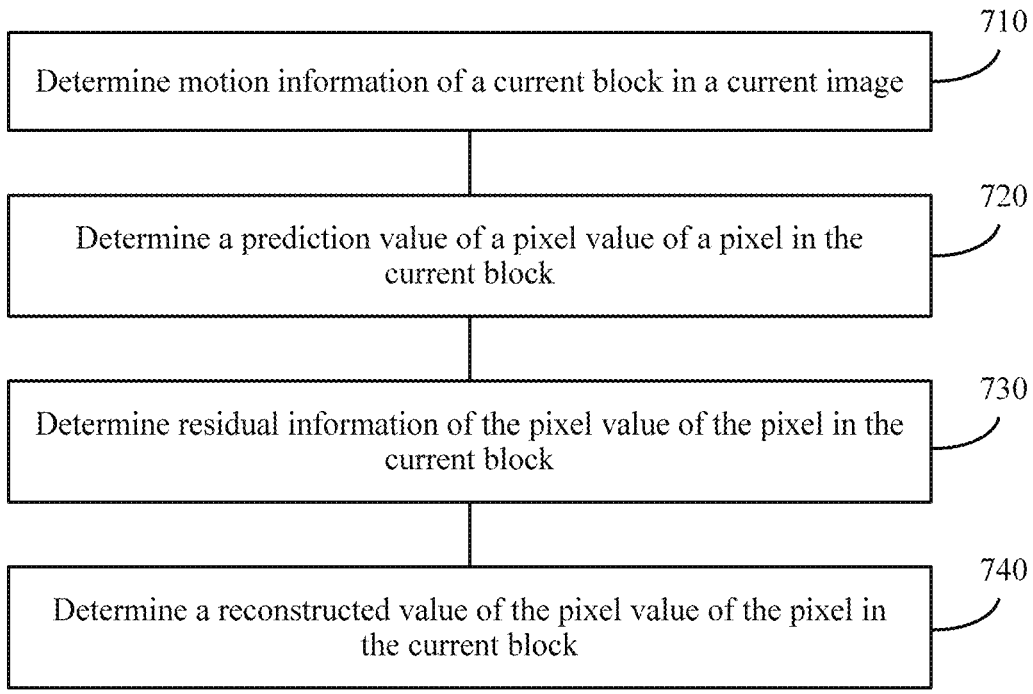
FIG. 26 is a schematic flowchart of a decoding process of a panoramic video decoder.

FIG. 26 is a schematic flowchart of a decoding process of a panoramic video decoder. The method includes the following steps.

710. Determine motion information of a current block in a current image.

In an embodiment, the decoder may decode a motion information bitstream, and determine the motion information of the current block based on a parsing result.

It should be understood that, in step 710, the motion information of the current block may further be determined by decoding indication information of prediction motion information and difference information between the prediction motion information and the motion information, that is, the motion information of the current block may be determined without directly parsing an encoded bitstream of the motion information. For example, the decoder side may construct a motion information set (for example, the motion information set includes motion information of a reconstructed block adjacent to the current block in terms of time or space, and a method for constructing the set is jointly agreed on between an encoder side and the decoder side). In this case, the decoder side may parse the indication information of the prediction motion information, then determine the prediction motion information from the set, and obtain the motion information of the current block based on the prediction motion information and the difference information between the prediction motion information and the motion information. In addition, it should be understood that the decoder side may further use, as the motion information of the current block, the prediction motion information determined based on the indication information of the prediction motion information. A specific method to be used is agreed on between the encoder side and the decoder side, or the encoder side transmits information about a used manner to the decoder side, and the decoder side determines, based on the received manner information, a manner used to determine the motion information of the current block.

In addition, in step 710, if unidirectional reference is used, one piece of motion information needs to be parsed out. If bidirectional reference is used, two pieces of motion information need to be parsed out. A specific quantity of pieces of motion information that need to be parsed out is jointly agreed on between the encoder side and the decoder side, or the encoder side transmits information related to a used piece quantity to the decoder side, and the decoder side determines the used piece quantity based on a parsing result.

720. Determine a prediction value of a pixel value of a pixel in the current block.

The decoder may determine, based on the motion information of the current block, a reference image of the current image in which the current block is located, and determine a location of a reference block in the reference image. Determining the prediction value of the pixel value of the pixel in the current block is determining a prediction value of a pixel value of each pixel in the current block, and the prediction value of the pixel value of the pixel may be determined based on the motion-compensated prediction method in the embodiments of this application.

It should be understood that after the prediction value of the pixel value of each pixel in the current block is obtained, a prediction block of the current block may be obtained based on the prediction value of the pixel value of each pixel, and the prediction block includes the prediction value of the pixel value of each pixel in the current block.

In step 720, if unidirectional reference is used, a location of only one reference block in a reference image in which the reference block is located needs to be determined. For one pixel in the current block, a location of only one reference pixel needs to be determined, and then the prediction value of the pixel value of the pixel in the current block may be determined based on the motion-compensated prediction method in the embodiments of this application.

If bidirectional reference is used, locations that are of two reference blocks of the current block and are in respective reference images of the two reference blocks need to be determined. For one pixel in the current block, locations of two reference pixels in the two reference blocks need to be separately determined. Subsequently, two prediction values of the pixel value of the pixel in the current block may be determined based on the motion-compensated prediction method in the embodiments of this application. Then, weighted processing or another operation is performed on the two prediction values to obtain the prediction value of the pixel value of the pixel in the current block. A specific operation manner is jointly agreed on between the encoder side and the decoder side, or the encoder side transmits a used method to the decoder side, and the decoder side determines the used method based on a parsing result.

In addition, after the prediction value of the pixel value of the pixel in the current block is obtained, another operation may be performed on the prediction value first, and a prediction value obtained by performing the operation is used as a final prediction value of the pixel value of the current pixel. For example, a prediction value obtained after smooth filtering is performed on the obtained prediction value may be used as the final prediction value of the pixel value of the current pixel. In an embodiment, whether to perform another operation and a used manner are jointly agreed on between the encoder side and the decoder side, or the encoder side transmits a used method to the decoder side, and the decoder side determines the used method based on a parsing result. In addition, bidirectional prediction may further be performed on the pixel value of the current pixel, that is, prediction may be performed for the current pixel twice, and then weighted processing is performed on two obtained prediction values to obtain the prediction value of the pixel value of the current pixel.

730. Determine residual information of the pixel value of the pixel in the current block.

The decoder decodes an encoded bitstream of the residual information of the pixel value of the pixel in the current block, and obtains the residual information of the pixel value of the pixel in the current block by using a dequantization method and an inverse transform method. To be specific, the decoder decodes an encoded bitstream of a residual block of the current block, and then obtains the residual block of the current block by using the dequantization method and the inverse transform method.

It should be understood that, in step 730, to determine the residual information of the pixel value of the pixel in the current block, only the inverse transform method or only the dequantization method may be used. A specific method to be used is jointly agreed on between the encoder side and the decoder side, or the encoder side transmits a used method to the decoder side, and the decoder side determines the used method based on a parsing result.

740. Determine a reconstructed value of the pixel value of the pixel in the current block.

A reconstructed value of the pixel value of each pixel in the current block may be obtained based on the pixel value that is of the pixel in the current block and that is obtained in step 720 and the residual information that is of the pixel value of the pixel in the current block and that is obtained in step 730. In addition, the prediction block of the current block may be obtained based on step 720, and then a reconstructed block of the current block may be obtained by adding the prediction block and the residual block obtained in step 730. The reconstructed block includes the reconstructed value of the pixel value of each pixel in the current block.

It should be understood that, in step 740, to obtain the reconstructed value of the pixel value of the pixel in the current block, after the prediction information and the residual information are added, some other operations may also need to be performed, such as de-blocking filtering. In an embodiment, whether other operations are required and which of the other operations is performed are jointly agreed on between the encoder side and the decoder side, or the encoder side transmits a used method to the decoder side, and the decoder side determines the used method based on a parsing result.

The foregoing describes in detail the decoding process of the panoramic video decoder with reference to FIG. 26. The decoding process is usually performed on an encoded bitstream obtained through encoding. With reference to FIG. 27, the following describes in detail an encoding process by using a panoramic video encoder as an example.

Generally, layout information of a spherical image may be determined after the spherical image is collected or generated. Therefore, before the encoder encodes a panoramic video, the encoder has learned of the layout information of the spherical image. The layout information of the spherical image is usually transmitted as header information. The header information is pilot information. In this way, after receiving an encoded bitstream, a decoder first decodes the header information, and then may decode a subsequent bitstream after obtaining the layout information of the spherical image based on the header information.

Figure 27:
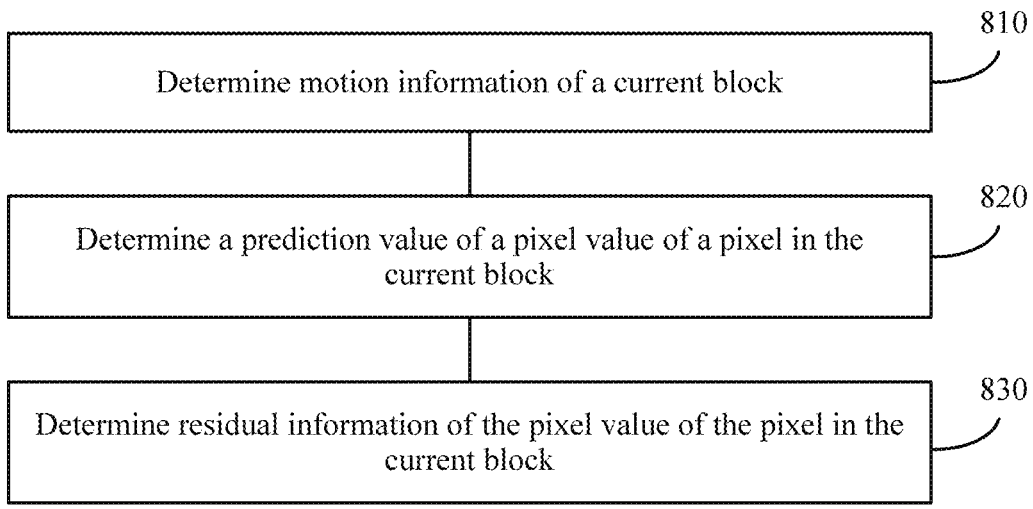
FIG. 27 is a schematic flowchart of an encoding process of a panoramic video encoder.

FIG. 27 is a schematic flowchart of an encoding process of a panoramic video encoder. The method includes the following steps.

810. Determine motion information of a current block.

The encoder first determines the motion information of the current block, and then encodes the motion information. In an embodiment, the encoder selects a reference image from a reconstructed image for a current image; searches a specified region in the reference image for a matching block for the current block; uses the matching block as a reference block of the current block; uses, as motion information, the reference image used in this process and motion vector information indicating a location offset of the reference block relative to the current block; and encodes the motion information.

When searching the specified region in the reference image for the reference block for the current block, a plurality of blocks may be selected for the current block first, and which block is finally selected as the reference block may be determined according to a rate-distortion optimization criterion. For example, a quantity of bits of motion information that need to be encoded when a candidate reference block is used as the matching block and a distortion value existing when a pixel value of a pixel in the current block is predicted by using a pixel value of a pixel in the current candidate reference block are determined, and a cost of the candidate reference block is determined by using a Lagrange optimization method. Then, a candidate reference block with a minimum cost is selected as the matching block. However, when a plurality of reference images exist, the foregoing operation needs to be performed on each image.

It should be understood that, in step 810, the motion information may not be directly encoded. Instead, indication information of prediction motion information or difference information between prediction motion information and the motion information is encoded. For example, the encoder side may construct a motion information set (for example, the motion information set includes motion information of a reconstructed block adjacent to the current block in terms of time or space, and a method for constructing the set is jointly agreed on between the encoder side and a decoder side). In this case, the encoder side may select one piece of motion information from the set as the prediction motion information, then obtain the difference information between the motion information of the current block and the prediction motion information, and encode the indication information of the prediction motion information and the difference information. In addition, the encoder may encode only the indication information of the prediction motion information such that the decoder side can determine motion information from the constructed motion information set based on the indication information, and use the motion information as the motion information of the current block. A specific method to be used is agreed on between the encoder side and the decoder side, or may be selected by using a rate-distortion optimization method, and the selected method is transmitted to the decoder side.

In step 810, if unidirectional reference is used, only one piece of motion information needs to be encoded. If bidirectional reference is used, two pieces of motion information need to be encoded. A specific quantity of pieces of motion information that need to be encoded is jointly agreed on between the encoder side and the decoder side, or may be determined by using the rate-distortion optimization method, and the encoder side transmits corresponding information to the decoder side.

When unidirectional reference is used, a location of one reference block in a reference image in which the reference block is located needs to be determined. For one current pixel in the current block, a location of one reference pixel needs to be determined, and then a prediction value of the pixel value of the pixel in the current block is determined based on the motion-compensated prediction method in the embodiments of this application. If bidirectional reference is used, locations that are of two reference blocks of the current block and are in respective reference images of the two reference blocks need to be determined. To be specific, for one pixel in the current block, locations of two reference pixels in the two reference blocks need to be separately determined. Subsequently, two prediction values of the pixel value of the pixel in the current block may be determined based on the motion-compensated prediction method in the embodiments of this application. Then, weighted processing or another operation is performed on the two prediction values to obtain a prediction value of the pixel value of the pixel in the current block. A specific operation manner is jointly agreed on between the encoder side and the decoder side, or the encoder side transmits a used method to the decoder side, and the decoder side determines the used method based on a parsing result.

820. Determine a prediction value of a pixel value of a pixel in the current block.

The encoder may determine, based on the motion information of the current block, a reference image of a current image in which the current block is located, and determine a location of a reference block in the reference image. Determining the prediction value of the pixel value of the pixel in the current block is determining a prediction value of a pixel value of each pixel in the current block, and the prediction value of the pixel value of the pixel may be determined based on the motion-compensated prediction method in the embodiments of this application.

In addition, after the prediction value of the pixel value of the pixel in the current block is obtained, another operation may be performed on the prediction value first, and a prediction value obtained by performing the operation is used as a final prediction value of the pixel value of the current pixel. For example, a prediction value obtained after smooth filtering is performed on the obtained prediction value may be used as the final prediction value of the pixel value of the current pixel. In an embodiment, whether to perform another operation and a used manner are jointly agreed on between the encoder side and the decoder side, or the encoder side transmits a used method to the decoder side, and the decoder side determines the used method based on a parsing result. In addition, bidirectional prediction may further be performed on the pixel value of the current pixel, that is, prediction may be performed for the current pixel twice, and then weighted processing is performed on two obtained prediction values to obtain the prediction value of the pixel value of the current pixel.

830. Determine residual information of the pixel value of the pixel in the current block.

The encoder subtracts the prediction value from the pixel value of the pixel in the current block, to obtain the residual information of the pixel value of the pixel in the current block; then processes the residual information of the pixel value of the pixel in the current block based on a transform method and a quantization method; and encodes a result obtained through processing.

It should be understood that, when the residual information of the pixel value of the pixel in the current block is encoded, only the transform method or only the quantization method may be used. A specific method to be used is jointly agreed on between the encoder side and the decoder side, or is determined by the encoder side by using the rate-distortion optimization method, and transmits information to the decoder side.

Figure 28:
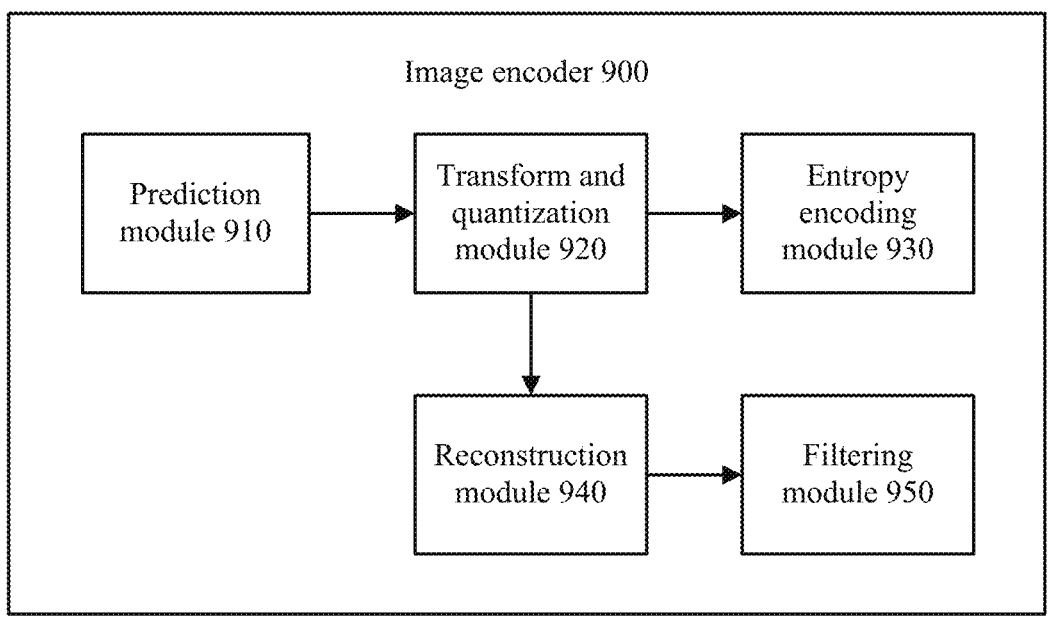
FIG. 28 is a schematic block diagram of an image encoder according to an embodiment of this application.

FIG. 28 is a schematic block diagram of an image encoder 900 according to an embodiment of this application. The image encoder 900 includes a prediction module 910, a transform and quantization module 920, an entropy encoding module 930, a reconstruction module 940, and a filtering module 950. A specific function of each module is as follows.

The prediction module 910 is configured to generate prediction data. The prediction module 910 may generate one or more prediction units (PU) of each coding unit CU that cannot be partitioned. Each PU of the CU may be associated with different pixel blocks in a pixel block of the CU. The prediction module 910 may generate a predictive pixel block for each PU of the CU. The prediction module 910 may generate the predictive pixel block of the PU through intra prediction or inter prediction. If the prediction module 910 generates the predictive pixel block of the PU through intra prediction, the prediction module 910 may generate the predictive pixel block of the PU based on a pixel in a decoded picture associated with the PU. If the prediction module 910 generates the predictive pixel block of the PU through inter prediction, the prediction module 10 may generate the predictive pixel block of the PU based on a pixel in one or more decoded pictures different from a picture associated with the PU. The prediction module 910 may generate a residual pixel block of the CU based on the predictive pixel block of the PU of the CU. The residual pixel block of the CU may indicate a difference between a sample value in the predictive pixel block of the PU of the CU and a corresponding sample value in an reference pixel block of the CU.

The transform and quantization module 920 is configured to process residual data obtained through prediction. The image encoder 900 may perform recursive quadtree partitioning on the residual pixel block of the CU, to partition the residual pixel block of the CU into one or more smaller residual pixel blocks associated with a transform unit (TU) of the CU. Because each pixel in the pixel block associated with the TU is corresponding to one luma sample and two chroma samples, each TU may be associated with one luma residual sample block and two chroma residual sample blocks. The image encoder 900 may apply one or more times of transform to the residual sample block associated with the TU to generate a coefficient block (namely, a block of coefficients). The transform may be DCT transform or a variant thereof. A DCT transform matrix is used, and two-dimensional transform is calculated by using one-dimensional transform in a horizontal direction and a vertical direction, to obtain the coefficient block. The image encoder 900 may perform a quantization operation on each coefficient in the coefficient block. Quantization usually means a process in which the coefficient is quantized to reduce an amount of data used to represent the coefficient to provide further compression.

The image encoder 900 may generate a set of syntax elements that represent the quantized coefficients in the coefficient block. The image encoder 900 may apply an entropy encoding operation (such as a context-adaptive binary arithmetic coding (CABAC) operation) to some or all of the foregoing syntax elements by using the entropy encoding module 930. To apply CABAC coding to the syntax elements, the entropy encoding module 930 may binarize the syntax elements to form a binary sequence including one or more bits (referred to as "binary digit"). The entropy encoding module 930 may encode a part of the binary digits through regular encoding, and may encode another part of the binary digits through bypass encoding.

In addition to entropy encoding of the syntax elements of the coefficient block, the image encoder 900 may apply, by using the reconstruction module 940, dequantization and inverse transform to the coefficient block obtained through transform, to reconstruct the residual sample block from the coefficient block obtained through transform. The image encoder 900 may add the reconstructed residual sample block and a corresponding sample block of one or more predictive sample blocks, to generate a reconstructed sample block. The image encoder 900 may reconstruct a pixel block associated with the TU by reconstructing a sample block of each color component. A pixel block of each TU of the CU is reconstructed in this manner, until reconstruction of the entire pixel block of the CU is completed.

After the image encoder 900 reconstructs the pixel block of the CU, the image encoder 900 performs a de-blocking filtering operation by using the filtering module 950, to reduce a blocking effect of a pixel block associated with the CU. After performing the de-blocking filtering operation, the image encoder 900 may modify a reconstructed pixel block of a CTB of a picture by using a sample adaptive offset (SAO) process. After performing these operations, the image encoder 900 may store the reconstructed pixel block of the CU in a decoded picture buffer, to generate a predictive pixel block of another CU.

In one or more embodiments, the described functions may be implemented by hardware, software, firmware, or any combination thereof. If the functions are implemented by software, the functions may be stored in a computer readable medium as one or more instructions or code lines or sent by a computer readable medium, and are executed by a hardware-based processing unit. The computer readable medium may include a computer readable storage medium (which is corresponding to a tangible medium such as a data storage medium) or a communications medium. The communications medium includes, for example, any medium that facilitates transmission of a computer program from a place to another place according to a communication protocol. In this manner, the computer readable medium may be generally corresponding to (1) a non-transitory tangible computer readable storage medium, or (2) a communications medium such as a signal or a carrier. The data storage medium may be accessed by one or more computers or one or more processors to retrieve an instruction, code, and/or a data structure, to implement any available medium in technologies described in this application. A computer program product may include a computer readable medium.

By way of example instead of limitation, some computer readable storage media may include a RAM, a ROM, an EEPROM, a CD-ROM or another optical disc storage, a magnetic disk storage or another magnetic storage apparatus, a flash memory, or any other medium that can be used to store required program code in a form of an instruction or a data structure and can be accessed by a computer. In addition, any connection may be appropriately referred to as a computer readable medium. For example, if an instruction is sent from a website, a server, or another remote source by using a coaxial cable, an optical cable, a twisted pair, a digital subscriber line (DSL), or a wireless technology (such as infrared, radio, or microwave), the coaxial cable, the optical cable, the twisted pair, the DSL, or the wireless technology (such as infrared, radio, or microwave) is included in a definition of a medium. However, it should be understood that the computer readable storage medium and the data storage medium do not include a connection, a carrier, a signal, or another transitory medium, but are non-transitory tangible storage media. A disk and an optical disc used in this specification include a compact disc (CD), a laser disc, an optical disc, a digital versatile disc (DVD), a floppy disk, and a Blu-ray disc. The disk usually copies data by a magnetic means, and the optical disc optically copies data by a laser means. A combination of the foregoing objects should further be included in a scope of the computer readable medium.

An instruction may be executed by one or more processors such as one or more digital signal processors (DSP), a general microprocessor, an application-specific integrated circuit (ASIC), a field programmable gate array (FPGA), or another equivalent integrated circuit or discrete logic circuit. Therefore, the term "processor" used in this specification may mean the foregoing structure or any other structure applicable to implementation of the technologies described in this specification. In addition, in some aspects, the functions described in this specification may be provided in a dedicated hardware and/or software module configured for encoding and decoding, or may be incorporated into a combined codec. In addition, the technologies may be totally implemented in one or more circuits or logic elements.

The technologies in this application may be widely implemented by a plurality of apparatuses or devices. The apparatus or the device includes a radio handset, an integrated circuit (IC), or an IC set (such as a chip set). In this application, various components, modules, and units are described to emphasize functions of an apparatus configured to implement the disclosed technologies, but the functions do not need to be implemented by different hardware units. Precisely, as described above, various units may be combined into a hardware unit of the codec, or may be provided by a set of interoperable hardware units (including one or more processors described above) and appropriate software and/or firmware.

It should be understood that "an implementation" or "one implementation" mentioned in the whole specification means that particular features, structures, or characteristics related to the implementation are included in at least one implementation of this application. Therefore, "in an implementation" or "in one implementation" appearing throughout the specification does not mean a same implementation. In addition, these particular features, structures, or characteristics may be combined in one or more implementations in any appropriate manner.

It should be understood that sequence numbers of the foregoing processes do not mean execution sequences in various implementations of this application. The execution sequences of the processes should be determined according to functions and internal logic of the processes, and should not be construed as any limitation on the implementation processes of the implementations of this application.

In addition, the terms "system" and "network" in this specification may be used interchangeably in this specification. It should be understood that, the term "and/or" in this specification describes only an association relationship for describing associated objects and represents that three relationships may exist. For example, A and/or B may represent the following three cases. Only A exists, both A and B exist, and only B exists. In addition, the character "/" in this specification usually indicates an "or" relationship between the associated objects.

It should be understood that in the implementations of this application, "B corresponding to A" indicates that B is associated with A, and B may be determined based on A. However, it should further be understood that determining A based on B does not mean that B is determined based on A only, that is, B may also be determined based on A and/or other information.

A person of ordinary skill in the art may be aware that, in combination with the examples described in the implementations disclosed in this specification, units and algorithm steps may be implemented by electronic hardware, computer software, or a combination thereof. To clearly describe the interchangeability between the hardware and the software, the foregoing has generally described compositions and steps of the examples according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in other implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on requirements to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A motion-compensated prediction method comprising:
   determining a location of an initial reference pixel of a current pixel in a reference image, wherein the current pixel is located in a first sub-image in a current image;
   determining, based on the location of the initial reference pixel and a location of a sphere center of a sphere corresponding to the reference image, a spherical reference location corresponding to a target reference pixel of the current pixel on a surface of the sphere when the initial reference pixel is located outside a second sub-image in the reference image and at a location corresponding to the first sub-image;
   determining, based on the spherical reference location, a polyhedral reference location corresponding to the target reference pixel on a surface of a polyhedron corresponding to the reference image, wherein the sphere is internally tangent to the polyhedron, and wherein a connection line between the polyhedral reference location and the location of the sphere center passes through the spherical reference location;
   determining a location of the target reference pixel in the reference image based on the polyhedral reference location; and
   determining a prediction value of a pixel value of the current pixel based on at least one of a pixel value of the target reference pixel or a pixel value of a neighboring pixel of the target reference pixel.

2. The method of claim 1, wherein determining the spherical reference location corresponding to the target reference pixel of the current pixel on the surface of the sphere comprises:
   determining, based on the location of the initial reference pixel and an offset value of the location of the initial reference pixel relative to the second sub-image, a first location of the initial reference pixel on a plane on which a first face of the polyhedron is located, wherein the first face is a face corresponding to the second sub-image of the polyhedron; and
   determining, based on the first location and the location of the sphere center of the sphere, the spherical reference location corresponding to the target reference pixel on the surface of the sphere, wherein a connection line between the first location and the location of the sphere center passes through the spherical reference location.

3. The method of claim 1 further comprising determining, based on layout information of the reference image and the location of the initial reference pixel, whether the initial reference pixel is located outside the second sub-image in the reference image.

4. The method of claim 1, wherein determining the location of the target reference pixel in the reference image based on the polyhedral reference location comprises determining the location of the target reference pixel in the reference image based on the polyhedral reference location and layout information of the polyhedron.

5. The method of claim 1, wherein the layout information comprises at least one of face quantity information of the polyhedron, sub-image arrangement manner information of the reference image, sub-image arrangement order information of the reference image, or sub-image rotation information of the reference image.

6. The method of claim 1, wherein determining the prediction value of the pixel value of the current pixel comprises determining the pixel value of the target reference pixel as the prediction value of the pixel value of the current pixel.

7. The method of claim 1, wherein determining the prediction value of the pixel value of the current pixel comprises:
   performing weighted processing on the pixel value of the target reference pixel and the pixel value of the neighboring pixel of the target reference pixel; and
   determining, as the prediction value of the pixel value of the current pixel, a pixel value at the location of the target reference pixel obtained through weighted processing.

8. The method of claim 1, wherein determining the prediction value of the pixel value of the current pixel comprises:
   performing an interpolation operation at the location of the target reference pixel based on the pixel value of the neighboring pixel of the target reference pixel; and
   determining, as the prediction value of the pixel value of the current pixel, a pixel value obtained through the interpolation operation.

9. A motion-compensated prediction method comprising:
   determining a location of an initial reference pixel of a current pixel in a reference image, wherein the current pixel is located in a first sub-image in a current image;

determining a location of a target reference pixel of the current pixel in an extended region of the second sub-image when the initial reference pixel is located outside a second sub-image that is in the reference image and that is at a location corresponding to the first sub-image,
  wherein the extended region of the second sub-image is located outside the second sub-image, and the extended region comprises a plurality of pixels,
  wherein a pixel value of a first pixel in the extended region is determined based on a pixel value of a second pixel in the reference image,
  wherein a connection line between a sphere center of a sphere corresponding to the reference image and a polyhedral reference location corresponding to the second pixel on a surface of a polyhedron corresponding to the reference image passes through a spherical reference location corresponding to the second pixel on the sphere corresponding to the reference image,
  wherein the spherical reference location is determined based on the location of the initial reference pixel and a location of the sphere center of the sphere, and
  wherein the sphere is internally tangent to the polyhedron; and
determining a prediction value of a pixel value of the current pixel based on at least one of a pixel value of the target reference pixel or a pixel value of a neighboring pixel of the target reference pixel.

10. The method of claim 9 further comprising:
determining, based on a location of the first pixel and the location of the sphere center of the sphere corresponding to the reference image, the spherical reference location corresponding to the second pixel and that is on a surface of the sphere;
determining, based on the spherical reference location, the polyhedral reference location corresponding to the second pixel on the surface of the polyhedron corresponding to the reference image; and
determining a location of the second pixel in the reference image based on the polyhedral reference location.

11. The method of claim 10, wherein determining the spherical reference location corresponding to the second pixel on the surface of the sphere comprises:
determining, based on the location of the first pixel and an offset value of the location of the first pixel relative to the second sub-image, a first location of the first pixel on a plane on which a first face of the polyhedron is located, wherein the first face is a face corresponding to the second sub-image of the polyhedron; and
determining, based on the first location and the location of the sphere center of the sphere, the spherical reference location corresponding to the second pixel on the surface of the sphere, wherein a connection line between the first location and the location of the sphere center passes through the spherical reference location.

12. The method of claim 9 further comprising determining, based on layout information of the reference image and the location of the initial reference pixel, whether the initial reference pixel is located outside the second sub-image in the reference image.

13. A motion-compensated prediction apparatus comprising:
a memory; and
a processor coupled to the memory, the processor configured to:
  determine a location of an initial reference pixel of a current pixel in a reference image, wherein the current pixel is located in a first sub-image in a current image;
  determine, based on the location of the initial reference pixel and a location of a sphere center of a sphere corresponding to the reference image, a spherical reference location corresponding to a target reference pixel of the current pixel on a surface of the sphere when the initial reference pixel is located outside a second sub-image in the reference image and at a location corresponding to the first sub-image;
  determine, based on the spherical reference location, a polyhedral reference location corresponding to the target reference pixel on a surface of a polyhedron corresponding to the reference image, wherein the sphere is internally tangent to the polyhedron, and wherein a connection line between the polyhedral reference location and the location of the sphere center passes through the spherical reference location;
  determine a location of the target reference pixel in the reference image based on the polyhedral reference location; and
  determine a prediction value of a pixel value of the current pixel based on at least one of a pixel value of the target reference pixel or a pixel value of a neighboring pixel of the target reference pixel.

14. The motion-compensated prediction apparatus of claim 13, wherein the processor is further configured to:
determine, based on the location of the initial reference pixel and an offset value of the location of the initial reference pixel relative to the second sub-image, a first location of the initial reference pixel on a plane on which a first face of the polyhedron is located, wherein the first face is a face corresponding to the second sub-image of the polyhedron; and
determine, based on the first location and the location of the sphere center of the sphere, the spherical reference location corresponding to the target reference pixel on the surface of the sphere, wherein a connection line between the first location and the location of the sphere center passes through the spherical reference location.

15. The motion-compensated prediction apparatus of claim 13, wherein the processor is further configured to determine, based on layout information of the reference image and the location of the initial reference pixel, whether the initial reference pixel is located outside the second sub-image in the reference image.

16. The motion-compensated prediction apparatus of claim 13, wherein the processor is further configured to determine the location of the target reference pixel in the reference image based on the polyhedral reference location and layout information of the polyhedron.

17. The motion-compensated prediction apparatus of claim 13, wherein the layout information comprises at least one of face quantity information of the polyhedron, sub-image arrangement manner information of the reference image, sub-image arrangement order information of the reference image, or sub-image rotation information of the reference image.

18. The motion-compensated prediction apparatus of claim 13, wherein the processor is further configured to determine the pixel value of the target reference pixel as the prediction value of the pixel value of the current pixel.

19. The motion-compensated prediction apparatus of claim 13, wherein the processor is further configured to:
perform weighted processing on the pixel value of the target reference pixel and the pixel value of the neighboring pixel of the target reference pixel; and
determine, as the prediction value of the pixel value of the current pixel, a pixel value at the location of the target reference pixel obtained through weighted processing.

20. The motion-compensated prediction apparatus of claim 13, wherein the processor is further configured to:
perform an interpolation operation at the location of the target reference pixel based on the pixel value of the neighboring pixel of the target reference pixel; and
determine, as the prediction value of the pixel value of the current pixel, a pixel value obtained through the interpolation operation.

21. A motion-compensated prediction apparatus comprising:
a memory; and
a processor coupled to the memory, the processor configured to:
determine a location that is of an initial reference pixel of a current pixel and that is in a reference image, wherein the current pixel is located in a first sub-image in a current image;
determine a location of a target reference pixel of the current pixel in an extended region of the second sub-image when the initial reference pixel is located outside a second sub-image that is in the reference image and that is at a location corresponding to the first sub-image,
wherein the extended region of the second sub-image is located outside the second sub-image, and the extended region comprises a plurality of pixels,
wherein a pixel value of a first pixel in the extended region is determined based on a pixel value of a second pixel in the reference image,
wherein a connection line between a sphere center of a sphere corresponding to the reference image and a polyhedral reference location corresponding to the second pixel on a surface of a polyhedron corresponding to the reference image passes through a spherical reference location corresponding to the second pixel on the sphere corresponding to the reference image,
wherein the spherical reference location is determined based on the location of the initial reference pixel and a location of the sphere center of the sphere, and
wherein the sphere is internally tangent to the polyhedron; and
determine a prediction value of a pixel value of the current pixel based on at least one of a pixel value of the target reference pixel or a pixel value of a neighboring pixel of the target reference pixel.

22. The motion-compensated prediction apparatus of claim 21, wherein the processor is further configured to:
determine, based on a location of the first pixel and the location of the sphere center of the sphere corresponding to the reference image, the spherical reference location corresponding to the second pixel on a surface of the sphere;
determine, based on the spherical reference location, the polyhedral reference location corresponding to the second pixel on the surface of the polyhedron corresponding to the reference image; and
determine a location of the second pixel in the reference image based on the polyhedral reference location.

23. The motion-compensated prediction apparatus of claim 22, wherein the processor is further configured to:
determine, based on the location of the first pixel and an offset value of the location of the first pixel relative to the second sub-image, a first location of the first pixel on a plane on which a first face of the polyhedron is located, wherein the first face is a face corresponding to the second sub-image of the polyhedron; and
determine, based on the first location and the location of the sphere center of the sphere, the spherical reference location corresponding to the second pixel on the surface of the sphere, wherein a connection line between the first location and the location of the sphere center passes through the spherical reference location.

24. The motion-compensated prediction apparatus of claim 21, wherein the processor is further configured to determine, based on layout information of the reference image and the location of the initial reference pixel, whether the initial reference pixel is located outside the second sub-image in the reference image.

* * * * *